US009286082B1

(12) United States Patent
Hobbs

(10) Patent No.: US 9,286,082 B1
(45) Date of Patent: Mar. 15, 2016

(54) METHOD AND SYSTEM FOR IMAGE SEQUENCE TRANSFER SCHEDULING

(71) Applicant: Teradici Corporation, Burnaby (CA)

(72) Inventor: David Victor Hobbs, Surrey (CA)

(73) Assignee: Teradici Corporation, Burnaby, British Columbia (CA)

( * ) Notice: Subject to any disclaimer, the term of this patent is extended or adjusted under 35 U.S.C. 154(b) by 336 days.

(21) Appl. No.: 13/902,204

(22) Filed: May 24, 2013

Related U.S. Application Data

(63) Continuation of application No. 12/460,384, filed on Jul. 17, 2009, now Pat. No. 8,453,148, which is a continuation-in-part of application No. 11/278,128, filed on Mar. 30, 2006, now Pat. No. 8,766,993, and a continuation-in-part of application No. 11/904,879, filed on Sep. 28, 2007, now Pat. No. 8,341,624.

(60) Provisional application No. 61/086,580, filed on Aug. 6, 2008, provisional application No. 60/669,178, filed on Apr. 6, 2005, provisional application No. 60/827,382, filed on Sep. 28, 2006.

(51) Int. Cl.
*G06F 9/44* (2006.01)
*G06F 9/455* (2006.01)
*G06F 9/46* (2006.01)

(52) U.S. Cl.
CPC .... *G06F 9/4445* (2013.01); *G06F 2009/45595* (2013.01)

(58) Field of Classification Search
None
See application file for complete search history.

(56) References Cited

U.S. PATENT DOCUMENTS

| 5,018,076 | A | 5/1991 | Johary et al. |
| 5,526,017 | A | 6/1996 | Wilkie |
| 5,742,745 | A | 4/1998 | Sugikawa et al. |
| 5,883,670 | A | 3/1999 | Sporer et al. |
| 6,012,101 | A | 1/2000 | Heller et al. |
| 6,038,616 | A | 3/2000 | Thornton et al. |
| 6,046,751 | A | 4/2000 | Kato et al. |
| 6,119,146 | A | 9/2000 | Heller et al. |
| 6,252,979 | B1 | 6/2001 | Lee et al. |
| 6,333,750 | B1 | 12/2001 | Odryna et al. |
| 6,385,666 | B1 | 5/2002 | Thornton et al. |

(Continued)

OTHER PUBLICATIONS

"Zero Client Technology: History, Use and Critical Comparison", Applica Inc. Web Article (www.applica.com/zeroCtech.shtml) 4 pages. Copyright 1997-2005.

(Continued)

*Primary Examiner* — Eric C Wai
(74) *Attorney, Agent, or Firm* — Moser Taboada

(57) ABSTRACT

A method and apparatus for generating and communicating encoded images. In one embodiment, the apparatus comprises a graphics processor for rendering, for each display of a plurality of displays, a plurality of images from a plurality of drawing command sets, wherein each drawing command set is generated by a separate VM of a plurality of VMs in response to HID events received from a network location associated with a corresponding display; an image encoder for generating an encoding of each image of the plurality of images, each encoding comprising indications of changed and unchanged portions of a corresponding image; and a scheduler, coupled to the image encoder by a computer expansion bus, for scheduling generation of the encoding based on completion of (i) a rendering of an associated image from the plurality of images and (ii) a transmitting, via the IP network, of an encoding of a previously associated image.

18 Claims, 5 Drawing Sheets

(56) References Cited

U.S. PATENT DOCUMENTS

| | | |
|---|---|---|
| 6,483,515 B1 | 11/2002 | Hanko |
| 6,535,238 B1 | 3/2003 | Kressin |
| 6,570,890 B1 | 5/2003 | Keenan et al. |
| 6,806,885 B1 | 10/2004 | Piper et al. |
| 6,934,945 B1 | 8/2005 | Ogilvy |
| 7,024,045 B2 | 4/2006 | McIntyre |
| 7,043,748 B2 | 5/2006 | Thornton et al. |
| 7,095,386 B2 | 8/2006 | Alben et al. |
| 7,133,362 B2 | 11/2006 | Chu et al. |
| 7,136,394 B2 | 11/2006 | Horowitz et al. |
| 7,161,557 B2 | 1/2007 | Thornton |
| 7,191,440 B2 | 3/2007 | Cota-Robles et al. |
| 7,317,685 B1 | 1/2008 | Flott et al. |
| 7,650,603 B2 | 1/2010 | Green |
| 7,676,578 B1 | 3/2010 | Zhu et al. |
| 7,747,086 B1 | 6/2010 | Hobbs et al. |
| 7,822,278 B1 | 10/2010 | Hobbs et al. |
| 8,028,040 B1 | 9/2011 | Hobbs et al. |
| 8,200,796 B1 | 6/2012 | Margulis |
| 8,341,270 B2 | 12/2012 | Mazzaferri et al. |
| 2001/0000539 A1 | 4/2001 | Heller et al. |
| 2001/0011965 A1 | 8/2001 | Wilks |
| 2002/0059639 A1 | 5/2002 | Thornton et al. |
| 2002/0143842 A1 | 10/2002 | Cota-Robles et al. |
| 2002/0149617 A1 | 10/2002 | Becker |
| 2002/0180725 A1 | 12/2002 | Simmonds et al. |
| 2003/0033441 A1 | 2/2003 | Forin et al. |
| 2003/0098820 A1 | 5/2003 | Someya et al. |
| 2003/0193486 A1 | 10/2003 | Estrop |
| 2003/0208340 A1 | 11/2003 | Dorough |
| 2003/0212811 A1 | 11/2003 | Thornton |
| 2004/0001622 A1 | 1/2004 | Roylance et al. |
| 2004/0015597 A1 | 1/2004 | Thornton |
| 2004/0143664 A1 | 7/2004 | Usa et al. |
| 2004/0212730 A1 | 10/2004 | MacInnis et al. |
| 2004/0222941 A1 | 11/2004 | Wong et al. |
| 2004/0225744 A1 | 11/2004 | Frossard et al. |
| 2005/0060421 A1 | 3/2005 | Musunuri et al. |
| 2005/0108712 A1 | 5/2005 | Goyal |
| 2005/0114395 A1 | 5/2005 | Muralidharan |
| 2005/0204015 A1 | 9/2005 | Steinhart et al. |
| 2005/0240685 A1 | 10/2005 | Keys |
| 2005/0257239 A1 | 11/2005 | Evans et al. |
| 2006/0069458 A1 | 3/2006 | Lee et al. |
| 2006/0089992 A1 | 4/2006 | Blaho |
| 2006/0123166 A1 | 6/2006 | Toebes et al. |
| 2006/0282855 A1 | 12/2006 | Margulis |
| 2007/0097130 A1 | 5/2007 | Margulis |
| 2007/0124474 A1 | 5/2007 | Margulis |
| 2007/0209035 A1 | 9/2007 | Sonderegger et al. |
| 2008/0037656 A1 | 2/2008 | Hannuksela |
| 2009/0024746 A1 | 1/2009 | Welch |
| 2010/0131669 A1 | 5/2010 | Srinivas et al. |

OTHER PUBLICATIONS

Dale Beermann, Greg Humphreys, "Visual Computing in the Future: Computer Graphics as a Remote Service", University of Virginia, Computer Science Department, University of Virginia Technical Report CS-2003-16, 25 Pages, Jun. 1, 2003.

William Blanke, Chandrajit Bajaj, Donald Fussell, and Xiaoyu Zhang, "The Metabuffer: A Scalable Multiresolution Multidisplay 3-D Graphics System Using Commodity Rendering Engines", TR200-16, The University of Texas at Austin, 7 Pages, Feb. 2000.

U.S. Appl. No. 60/827,391, filed Sep. 28, 2006.

U.S. Appl. No. 11/549,055, filed Oct. 12, 2006.

U.S. Appl. No. 11/694,756, filed Mar. 30, 2007.

Han Chen, Yuqun Chen, Adam Finkelstein, Thomas Funkhouser, Kai Li, Zhiyan Liu, Rudrajit Samanta, and Grant Wallace. "Data Distribution Strategies for High-Resolution Displays", Computers & Graphics. vol. 25 No. 5 :811-818, 14 Pages, Oct. 2001.

A. Heirich and L. Moll. "Scalable Distributed Visualization Using Off-The-Shelf Components", IEEE Parallel Visualization and Graphics Symposium—1999, San Francisco, California, pp. 55-60, Oct. 1999.

Greg Humphreys, Matthew Eldridge, Ian Buck, Gordon Stoll, Matthew Everett, and Pat Hanrahan, "WireGL: A Scalable Graphics System for Clusters". Computer Graphics (SIGGRAPH 2001), 12 Pages, 2001.

Tristan Richardson, Quentin Stafford-Fraser, Kenneth R. Wood and Andy Hopper, "Virtual Network Computing", Reprint from IEEE Internet Computing vol. 2, No. 1, 7 Pages, Jan./Feb. 1998.

"OpenGL Vizserver™3.1 Application-Transparent Remote Interactive Visualization and Collaboration", Silicon Graphics Inc. 15 pages, 2003.

Rajvikram Singh, Byungil Jeong, Luc Renambot, Andrew Johnson, Jason Leigh "TeraVision: a Distributed, Scalable, High Resolution Graphics Streaming System", Proceedings of Cluster 2004, San Diego, CA, 10 pages, Sep. 2004.

"Applica Presenter Product Datasheet", SmartAVI, Inc, 3111 Winona Ave, Suite 101 Burbank, CA 91504, 4 Pages, 2013.

Roger Zimmermann and Dwipal A. Desai, "Ethernet Interface for Head-Mounted Displays", USC Technical Report USC-CS-TR05-846, Integrated Media Systems Center, University of Southern California, 12 pages, Mar. 18, 2005.

Appsense Performance Manager Datasheet v1.1, 2005, "Dynamically Manage System Performance, Availability and Capacity", pp. 1-2.

Office Action mailed Aug. 5, 2009 for U.S. Appl. No. 11/278,128 entitled "Methods and Apparatus for Enabling Multiple Remote Displays", David V. Hobbs, filed Mar. 30, 2006, pp. 1-32.

U.S. Appl. No. 11/904,879 entitled "Method and Apparatus for Scheduling a Resource of a Virtual Machine", David Victor Hobbs, filed Sep. 28, 2007, pp. 1-41.

Final Office Action mailed Apr. 1, 2010 for U.S. Appl. No. 11/278,128 entitled "Methods and Apparatus for Enabling Multiple Remote Displays", David V. Hobbs, filed Mar. 30, 2006, pp. 1-36.

Office Action mailed Jun. 21, 2011, for U.S. Appl. No. 11/864,637, entitled "Apparatus and Method for Managing Virtualized Device Traffic", David V. Hobbs, filed Sep. 28, 2007, 18 pages.

Office Action for co-pending U.S. Appl. No. 11/904,879, mailed May 6, 2011, entitled "Method and Apparatus for Scheduling a Resource of a Virtual Machine", David Victor Hobbs, filed Sep. 28, 2007, 27 pages.

"USB/IP: A Transparent Device Sharing Technology over IP Network", Hirofuchi, et al., Nara Institute of Science and Technology, 12 pages, 2005.

Final Office Action dated Dec. 28, 2010 for U.S. Appl. No. 11/613,981 entitled "Methods and Apparatus for Communications Between a Virtualized Host and Remote Devices", 25 pages.

"VMware Workload Management with AppSense Performance Manager," Whitepaper, AppSense Ltd., 3200 Daresbury Park, Daresbury, Warrington, WA4 4BU, United Kingdom, 12 pgs., 2013.

AppSense Performance Manager Datasheet v1.1, 2005, 2 pgs.

Isovic, Damir and Fohler, Gerhard, "Quality aware MPEG-2 Stream Adaptation in Resource Constrained Systems," Department of Computer Engineering, Malardalen University, Vasteras, Sweden; downloaded from web site www.mrtc.mdh.se/publications/0679.pdf on Feb. 6, 2008, 10 pgs.

Lubonski, Marcin et al., "An Adaptation Architecture to Improve User-Perceived QoS of Multimedia Services for Enterprise Remote Desktop Protocols," University of Technology, Sydney, Australia. Downloaded from web site www.utsydney.cn/www-staffit/~simmonds/Papers/NGI05_Marcin.pdf on Feb. 6, 2008, 10 pgs.

Domjan, Hans and Gross, Thomas R., "Extending a Best-Effort Operating System to Provide QoS Processor Management," Departement Informatik ETH Zurich. Downloaded from web site people.inf.ethz.ch/domjan/doc/iwqos.pdf on Feb. 6, 2008, 15 pgs.

Hansen, Jacob Gorm, "Blink: 3D Display Multiplexing for Virtualized Applications," Department of Computer Science, University of Copenhagen, Denmark. Downloaded from web site www.diku.dk/~jacobg/pubs/blink-techreport.pdf on Feb. 6, 2008.

Hirofuchi, Takahiro et al., "USB/IP—a Peripheral Bus Extension for Device Sharing over IP Network," Nara Institute of Science and Technology, USENIX 2005 Annual Technical Conference, FREENIX Track, pp. 47-60. Anaheim, California, Apr. 10, 2005.

(56) References Cited

OTHER PUBLICATIONS

"White Paper—The Business of N-Port Virtualization," Emulex Corporation, 3333 Susan Street, Costa Mesa, CA 92626, Sep. 2005. Downloaded from web site www.virtual.com/whitepapers/Emulex_The_Business.pdf on Feb. 6, 2008, 5 pgs.

Dowty, M. and Sugerman, J., "GPU virtualization on VMware's hosted I/O architecture", SIGOPS Oper. Syst. Rev. 43, (Jul. 3, 2009), 73-82, U.S.A.

Xiantao Zhang; Yaozu Dong, "Optimizing Xen VMM Based on Intel® Virtualization Technology," 2008 ICICSE (International Conference on Internet Computing in Science and Engineering), Jan. 28-29, 2008, pp. 367-374, China.

METHOD AND SYSTEM FOR IMAGE SEQUENCE TRANSFER SCHEDULING

CROSS-REFERENCE TO RELATED APPLICATIONS

This application is a continuation of U.S. patent application Ser. No. 12/460,384 now U.S. Pat. No. 8,453,148, entitled "Method and System for Image Sequence Transfer Scheduling" and filed Jul. 17, 2009, which claims benefit of U.S. Provisional Patent Application Ser. No. 61/086,580, entitled "Image Sequence Transfer Scheduling Apparatus and Methods", filed Aug. 6, 2008 and which is a continuation-in-part of: (1) U.S. patent application Ser. No. 11/278,128 now U.S. Pat. No. 8,766,993, entitled "Methods and Apparatus for Managing Multiple Remote Displays", filed Mar. 30, 2006, which claims benefit of U.S. provisional patent application Ser. No. 60/669,178, filed Apr. 6, 2005, and (2) U.S. patent application Ser. No. 11/904,879 now U.S. Pat. No. 8,341,624, entitled "Method and Apparatus for Scheduling a Resource of a Virtual Machine", filed Sep. 28, 2007, which claims benefit of U.S. provisional patent application Ser. No. 60/827,382, filed Sep. 28, 2006. Each of the aforementioned related patent applications is herein incorporated in their entirety by reference.

BACKGROUND OF THE INVENTION

1. Field of the Invention

Embodiments of the present invention relate generally to a method and system for transferring image data from a processor memory to remote communication endpoints. Specifically, a plurality of image sequences, generated by independent entities, in processor memory are prioritized and scheduled for transfer based on at least one of image status and communications resource availability.

2. Description of the Related Art

Existing remote desktop protocols include various proprietary and open source technologies, such as SGI's OpenGL-based Vizserver, IBM's Deep Computing Visualization (DCV), Mercury International Technology's ThinAnywhere, Citrix ICA, Microsoft Remote Desktop Protocol (RDP), and HP's Remote Graphics Software, Virtual Network Computing (VNC), VirtualGL, and the Chromium Renderserver (CRRS).

Recently, initiatives such as Virtual Desktop Infrastructure (VDI) from VMWARE and XENDESKTOP from CITRIX CORPORATION have enabled traditional Personal Computers to be replaced by virtual machines which are aggregated and hosted on a centralized processing platform such as computer server. The virtualized computers then connect to a client computer using some form of protocol such as one of the existing remote desktop protocols described.

In order to prevent visible tearing in a displayed image on a remote desktop, drawing commands and data structures known to the art may be utilized in the architecture for copying a desktop image from a framebuffer to a display. Such drawing commands and data structures enable separation of a display buffer and a drawing buffer using multi-buffering techniques. However, copying multiple desktop images from multiple frame buffers in a virtualized environment to multiple endpoints presents numerous challenges if the original desktop display image quality is to be maintained for the remote desktop images.

Therefore, there is a need in the art for a method and system for effectively communicating a plurality of desktop images in a virtualized environment to a plurality of remote endpoints.

SUMMARY OF THE INVENTION

Embodiments of the present invention generally relate to a method and apparatus for generating and communicating encoded images substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The invention may be implemented in numerous ways, including as a process, an article of manufacture, an apparatus, a system, and as a set of computer-readable descriptions and/or instructions embedded on and/or in a computer-readable medium such as a computer-readable storage medium. In this specification, these implementations, or any other form that the invention may take, may be referred to as techniques. The Detailed Description provides an exposition of one or more embodiments of the invention that enable improvements in features such as performance, power utilization, cost, scalability, efficiency, and utility of use in the field identified above. The Detailed Description includes an Introduction to facilitate the more rapid understanding of the remainder of the Detailed Description. As is discussed in more detail in the Conclusions, the invention encompasses all possible modifications and variations within the scope of the issued claims.

The term processor as used herein refers to any type of processor, central processing unit (CPU), microprocessor, microcontroller, embedded processor, media processor, graphics processor, or any other programmable device capable of executing and/or interpreting instructions in a form of software (such as microcode, firmware and/or programs).

The term software as used herein refers to any type of computer-executable instructions for any type of processor, such as programs, applications, scripts, drivers, operating systems, firmware, and microcode. Computer-executable instructions include any types of instructions performed by a processor, such as binary instructions that are directly performed, instructions that are translated and/or decoded prior to being performed, and instructions that are interpreted.

The term 'image sequence' as used herein refers to a data sequence such as a stream of drawing commands, pixel data or both associated with a dynamic display image.

The term 'image portion' as used herein refers to part, or all, of one image frame (e.g., a display image frame) associated with an image sequence. An image portion is herein alternatively termed an 'image region' or an 'image area'.

The term 'display update' as used herein refers to change in an image sequence (generally affected by a software application) resultant in a changed image portion.

Figure 1:
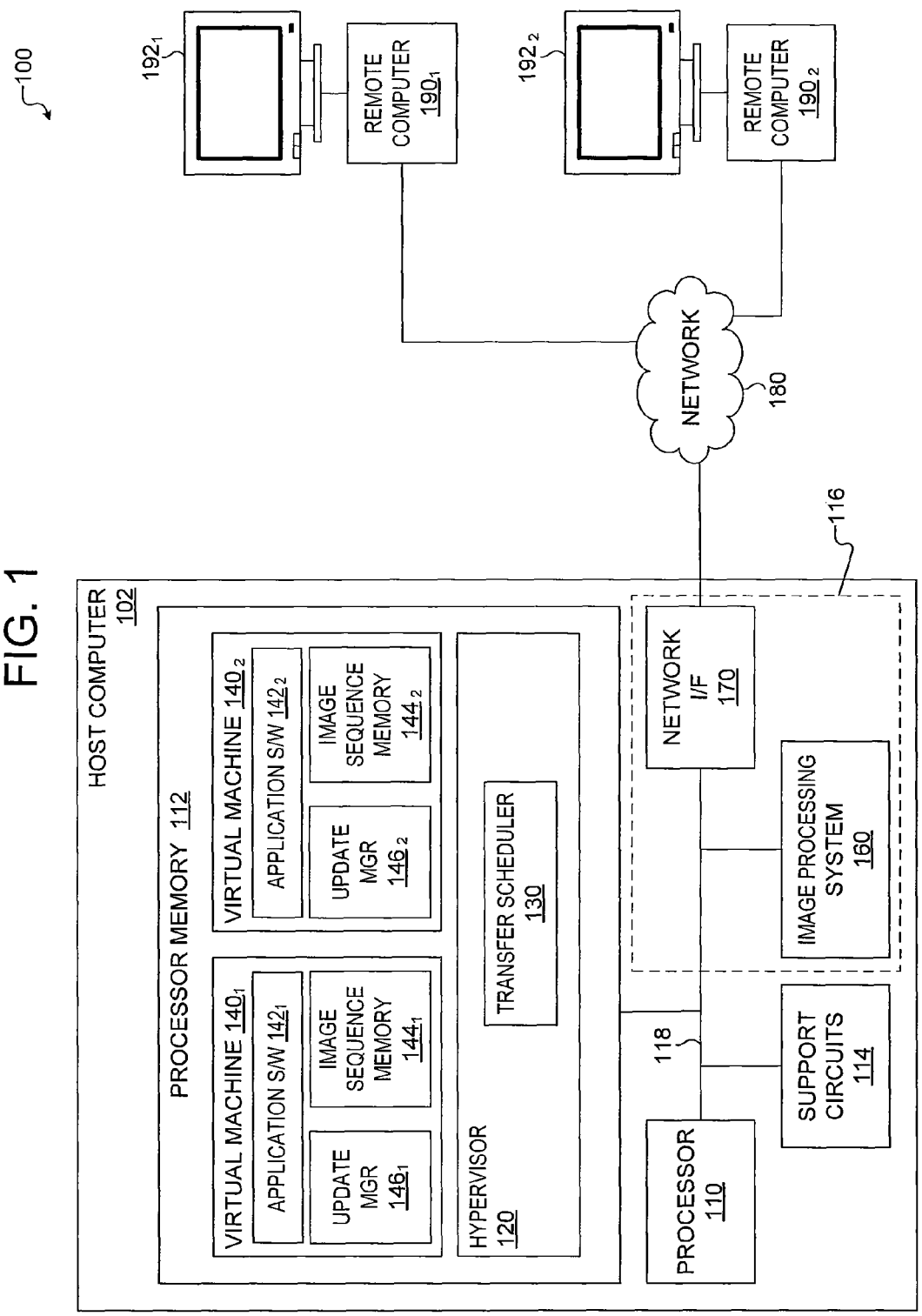
FIG. 1 illustrates selected details of an embodiment of a system comprising a processor and memory with a plurality of image sequences, connected to, and enabled to communicate with one or more communication endpoints.

In one or more embodiments of the present invention, a computer system, such as system 100 in FIG. 1, comprises a host computer coupled to multiple remote computers with displays by a network. The host computer comprises a processor, such as a Central Processing Unit (CPU) or Graphics Processing Unit (GPU), connected to memory. The processor executes application software related to the remote computers, where software associated with each remote computer is executed in a separate independent virtual machine (VM) environment, the VMs created and supported by the processor when the processor executes specific instructions, under the supervision of a common hypervisor. The application software and operating system in each virtual machine generate a display image comprising at least one image sequence which is stored in image sequence memory, for example comprising one or more frame buffers associated with the VM and corresponding remote computer. All or part of the image in image sequence memory is then encoded by an image processing system according to a schedule determined by a transfer scheduler and the encoded image is communicated to the associated remote computer where it is decoded and displayed.

In various embodiments, each VM comprises an update manager which provides image status information to the transfer scheduler so that the capture of image data from the various VMs can be prioritized and timed to ensure tear-free image capture, unnecessary queuing of data or sub-optimum use of communications resources. In some such embodiments, the image processing system provides the transfer scheduler with communication resource availability information such as shared encoder or network bandwidth availability so that encoding resources and image communications latency are optimized while preventing gaps or bottlenecks in the image processing and communication pipeline.

In further embodiments, the drawing software of a virtual machine is de-prioritized or suspended once image data has been captured which enables other application software or other virtual machines to meet image update or other application timing requirements.

FIG. 1 illustrates selected details of an embodiment of an image transfer system 100 ("system 100") comprising a host computer 102, such as a personal computer, computer server, or the like, coupled to and enabled to communicate with one or more communication endpoints, such as the plurality of remote computers 190 (illustrated as a remote computer $190_1$ and a remote computer $190_2$) coupled to the plurality of displays 192 (illustrated as a display $192_1$ and a display $192_2$). In some embodiments, the host computer 102 communicates a plurality of image sequences to the plurality of remote computers 190; i.e., as one example, a plurality of independent virtual machines ("entities") of the host computer 102 each generate one or more image sequences that are communicated to a remote computer of the remote computer 190, as further described below. Other embodiments of system 100 comprise alternative communications endpoints, such as one or more image storage systems or various combinations of display and storage endpoints.

Host computer 102 ("computer 102") is, generally, a computer or system of computers that has been designated for running software associated with a plurality of communication endpoints, such as user interfaces; wherein the software associated with each endpoint is typically executed in a separate virtual machine (VM) domain. In various embodiments, the software in each VM domain comprises operating system, driver software, and application software with display presentation requirements. In an embodiment, computer 102 comprises processor 110 coupled to memory 112 by bus 118, wherein bus 118 comprises one or more bus structures, such as memory and/or I/O busses known to the art. Processor 110 is also coupled to independent image transfer device 116, for example by one or more I/O busses or computer expansion card busses such as a Peripheral Component Interconnect (PCI)-Express bus, one or more graphics busses such as one or more Digital Visual Interface (DVI) or DisplayPort busses. In the embodiment of FIG. 1, computer 102 is coupled to remote computers $190_1$ and $190_2$ by network 180.

In various embodiments, processor 110 comprises one or more CPUs, one or more GPUs or a combination of CPU and GPU processing elements. FIG. 1 portrays only one variation of many possible configurations of computer 102. In some embodiments, computer 102 comprises multiple CPU cores or separate CPUs, for example interconnected by a HYPER-TRANSPORT fabric or the like with computer memory 112 distributed between CPUs accordingly. Examples of a well known suitable CPU include mobile, workstation or server class processors such as 32-bit, 64-bit or other CPUs including OPTERON, ATHLON or PHENOM class microprocessors manufactured by AMD Corporation, XEON, PERYN, PENTIUM or X86 class processors manufactured by INTEL, SPARC microprocessors manufactured by SUN MICROSYSTEMS Inc. or microprocessor such as a PowerPC processor manufactured by Motorola. However, any other microprocessor platform designed to perform the data processing methods described herein may be utilized.

Memory 112 comprises any one or combination of volatile computer readable media (e.g., random access memory (RAM), such as dynamic random access memory (DRAM), static random access memory (SRAM), extreme data rate (XDR) RAM, Double Data Rate (DDR) RAM etc.) and non-volatile computer readable media (e.g., ROM, hard drive, tape, CDROM, DVDROM, magneto-optical disks, Erasable Programmable Read-Only Memory (EPROM), Electrically Erasable Programmable Read-Only Memory (EEPROM), Flash EPROM etc.). Moreover, memory 112 may incorporate electronic, magnetic, optical, and/or other types of storage media. In an exemplary embodiment, the memory 112 stores executable software in the form of machine-readable instructions. Memory 112 further comprises hypervisor 120 with transfer scheduler 130 and the virtual machines 140 (illustrated as a virtual machine $140_1$ and a virtual machine $140_2$), where the virtual machines 140 are one example of independent entities that are created and supported by the processor 110 when the processor 110 executes specific instructions. In some embodiments, the virtual machines 140 comprise application software 142 (illustrated as an application s/w $142_1$ within virtual machine $140_1$ and an application s/w $142_2$ within virtual machine $140_2$), image sequence memory 144 (illustrated as an image sequence memory $144_1$ within virtual machine $140_1$ and an image sequence memory $144_2$ within virtual machine $140_2$) and update manager 146 (illustrated as an update manager $146_1$ within virtual machine $140_1$ and an update manager $146_2$ within virtual machine $140_2$). While the embodiment of system 100 comprises two VMs illustrated as virtual machine $140_1$ and virtual machine $140_2$, other embodiments may comprise additional VMs. For example, in some embodiments, processor 110 executes 32 or 64 VMs, at least one of the VMs comprising application software, update manager and image sequence memory. In some embodiments, image sequence memory (ref. memory 144) is located outside the VM domain, for example in memory associated with hypervisor 120 or video memory associated with a GPU. In some embodiments, the processor 110 is enabled to write asynchronous update portions for the plurality of image sequences into the processor memory 112 (e.g., into the image sequence memory 144 of the corresponding updated image sequence).

VM 140 is an operating system domain or similar 'computing process' of computer 102. In general terms, a VM 140 comprises an interdependent set of processes scheduled by hypervisor 120. Each VM 140 under control of the hypervisor 120 is an autonomous operating system environment with one or more applications and related drivers. In an exemplary embodiment, each VM 140 comprises an operating system such as a WINDOWS operating system from MICROSOFT, Inc. for example WINDOWS XP or WINDOWS VISTA, a LINUX operating system available from many vendors or a UNIX operating system, also available from many vendors including HEWLETT-PACKARD, Inc. or SUN MICROSYSTEMS, Inc.

Application software 142 comprises one or more executable applications with image display presentation or storage requirements, such as word processing software, spreadsheets, financial data presentation, video or photo display or editing software, graphics software such as Computer Aided Design (CAD) software, Desktop Publishing (DTP) software, digital signage software or the like.

Image sequence memory 144 comprises memory associated with the rendering, drawing or composition of one or more output images (e.g., image sequences) by the operating system, application software, graphics drivers such as OPENGL from SILICON GRAPHICS corporation or DIRECTX from MICROSOFT CORPORATION or image composition software such as the WINDOWS VISTA Desktop Windows Manager (DWM) or QUARTZ from APPLE CORPORATION. In various embodiments, memory 144 comprises at least one of a drawing command queue, a raster frame buffer, front and back frame buffers, a partial display image buffer (for example, comprising image data associated with part of a display image such as a video, picture, background or text window), or an image buffer associated with a display image spanning multiple display windows wherein each window corresponds to a separate display of a multi-display system. In some such embodiments, an image sequence spans multiple displays. In other such embodiments, application software 142 generates multiple image sequences spanning multiple displays, for example one image sequence per display.

Figure 2:
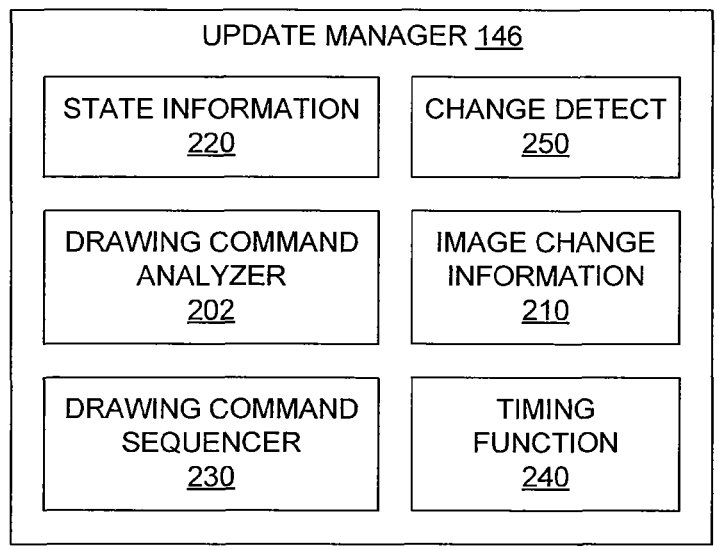
FIG. 2 illustrates selected details of an embodiment of an update manager enabled to determine image sequence availability information.

In an embodiment, update manager 146 comprises machine-executable software executed in virtual machine 140, or, alternatively, at least in part in virtual machine 140. In some alternative embodiments, update manager 146 comprises both a virtual machine component and a component in the hypervisor domain, (i.e., in such alternative embodiments the update manager 146 spans both the virtual machine 140 and the hypervisor 120), the hypervisor component comprising various functions of the update manager 146 and providing an interface to a hypervisor-based transfer scheduler, such as scheduler 130 discussed below. Update manager 146 monitors the status of image data in memory 144 (i.e., update manager 146 monitors erratic spatial and temporal updates to a corresponding image sequence) and provides status information associated with the image data, such as image sequence availability, to transfer scheduler 130 so that the transfer of image data from memory 144 to the image processing system is timed to avoid image tearing. In various embodiments, update manager 146 provides timing functions, such as frame timing, to graphics software (e.g., application software 142) in the absence of timing signals provided by a local display controller of computer 102 (such as Vertical Retrace (VSYNC) signal) used by graphics software to determine frame buffer update timing. An embodiment of update manager 146 is depicted in FIG. 2 and described in the corresponding text herein.

In alternative embodiments to system 100, parts or all of update manager 146 comprise machine executable software or hardware logic executed by at least one of a chipset, GPU, or processor 110.

According to various virtualized embodiments, hypervisor 120 manages the virtual machines 140 (and other virtual machines if present in computer 102). Generally, the hypervisor 120 (alternatively referred to as a Virtualization Manager' in some embodiments) coordinates the execution schedule of the virtual machines 140 and the interaction of the virtual machines 140 and various hardware components, for example by ensuring non-overlapping memory ranges available to each VM 140 in the system. Examples of commercially available hypervisor products include VMWARE ESX SERVER from EMC Corporation, XENSERVER from CITRIX Corporation, HYPER-V from MICROSOFT Corporation and products such as the VIRTUAL IRON hypervisor based on open source XEN source code.

Hypervisor 120 comprises VM scheduling software, for example various XEN embodiments comprise one of a 'Borrowed Virtual Time (BVT)', Atropos, round robin or sEDF schedulers known the art. An embodiment of VMWARE ESX 3.0 comprises a Distributed Resource Scheduler (DRS) which dynamically allocates and balances computing capacity across collections of hardware resources aggregated into logical resource pools. DRS monitors utilization across resource pools and allocates available resources among virtual machines.

In some embodiments, hypervisor 120 comprises a VM state monitor that monitors VM execution schedules, for example by maintaining a log of start and end timestamps when each VM 140 is swapped in and out from an execution state or by maintaining address traps that characterize image sequence memory accesses. In some such embodiments, execution timing information or image memory access information is provided to transfer scheduler 130 which in turn uses the execution timing information to adapt transfer priorities.

It will be appreciated by those of ordinary skill in the art that hypervisor 120 further comprises other functions such as resource manager, address manager, virtual machine monitors, distributed VM file system, network stack, virtual network interface, storage stack, device drivers and hardware interface drivers omitted from FIG. 1 for clarity.

Figure 3:
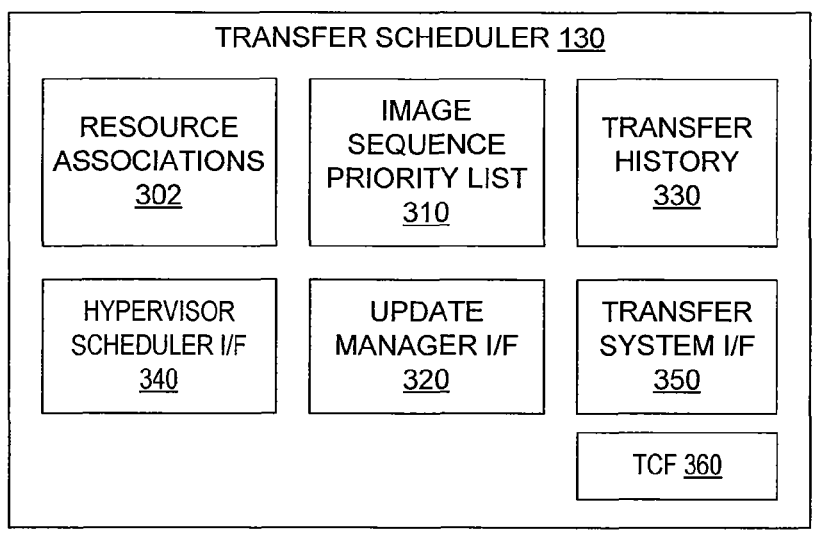
FIG. 3 illustrates selected details of an embodiment of a transfer scheduler enabled to prioritize the transfer of portions from different image sequences.
Figure 6:
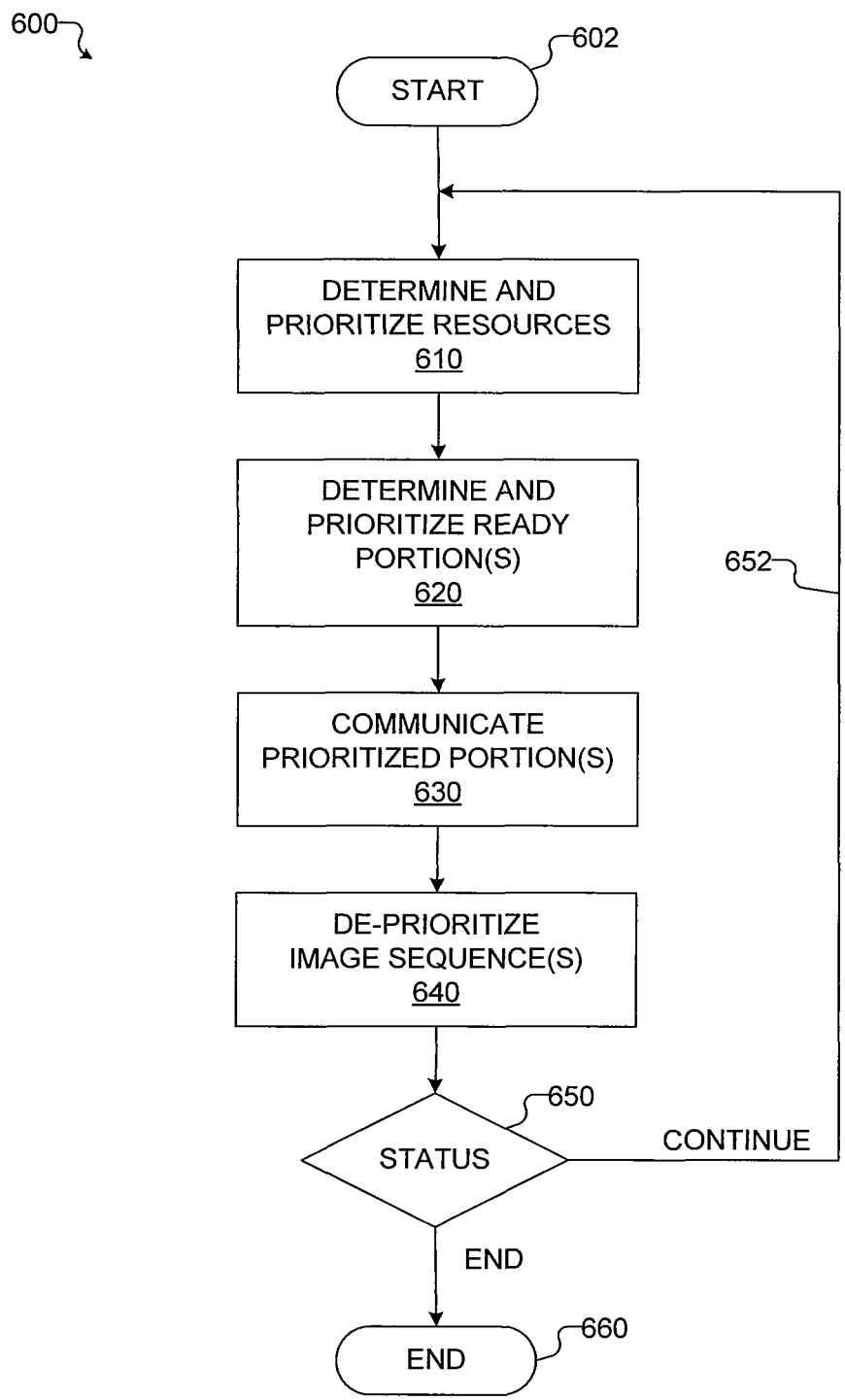
FIG. 6 illustrates an embodiment of a process for prioritizing and communicating image portions associated with different image sequences.

In an embodiment, transfer scheduler 130 comprises machine-executable software executed at least in part in hypervisor 120. Transfer scheduler 130 determines the timing for the transfer of image data from image sequence memory (ref. memory 144) based on image status information, such as image sequence availability provided by the update managers (ref. update manager 146), communication resource availability information provided by downstream image transfer means described below, and other resource allocation information such as other priority requirements. An embodiment of transfer scheduler 130 is depicted in FIG. 3 and described in the corresponding text herein. While the embodiment of system 100 comprises transfer scheduler 130 associated with hypervisor 120, in various alternative embodiments all or part of transfer scheduler 130 is executed as software or a set of logic functions associated with at least one of processor 110, a GPU or image processing system 160. An embodiment of a method for prioritizing and scheduling the transfer of portions or regions of images in image sequence memory 144 as executed by transfer scheduler 130 is depicted in FIG. 6.

In some embodiments such as various XEN-based paravirtualization environments, an Input/Output (I/O) VM is also present in memory 112. In some such paravirtualized embodiments, driver software is implemented as paired components split between the virtual machines and the IOVM using front-end (FE) and back-end (BE) driver structures know to the art. In some such embodiments, transfer scheduler 130 is located in the IOVM rather than the hypervisor. In other embodiments, update managers 146 comprise FE and BE components, enabling efficient communication coupling with the transfer scheduler.

It will be recognized by those skilled in the art that some embodiments of memory 112 further comprise other application software, operating system components, drivers, administrative software and the like, not depicted in FIG. 1 so as not to obscure aspects of the present invention.

In various embodiments, image transfer device 116 comprises an image processing system 160 and a network interface 170, which collectively operate to encode and communicate image data from computer 102 to the remote computers 190. In some embodiments, the image processing system 160 and network interface 170 of image transfer device 116 may be co-located on a single physical device, such as an Application Specific Integrated Circuit (ASIC) or System on Chip (SoC) device. In other embodiments, image transfer means comprising image processing system 160 and network interface 170 are implemented as separate physical devices coupled by some form of communication bus such as a PCI-Express bus or alternative peripheral device interconnect.

Figure 4:
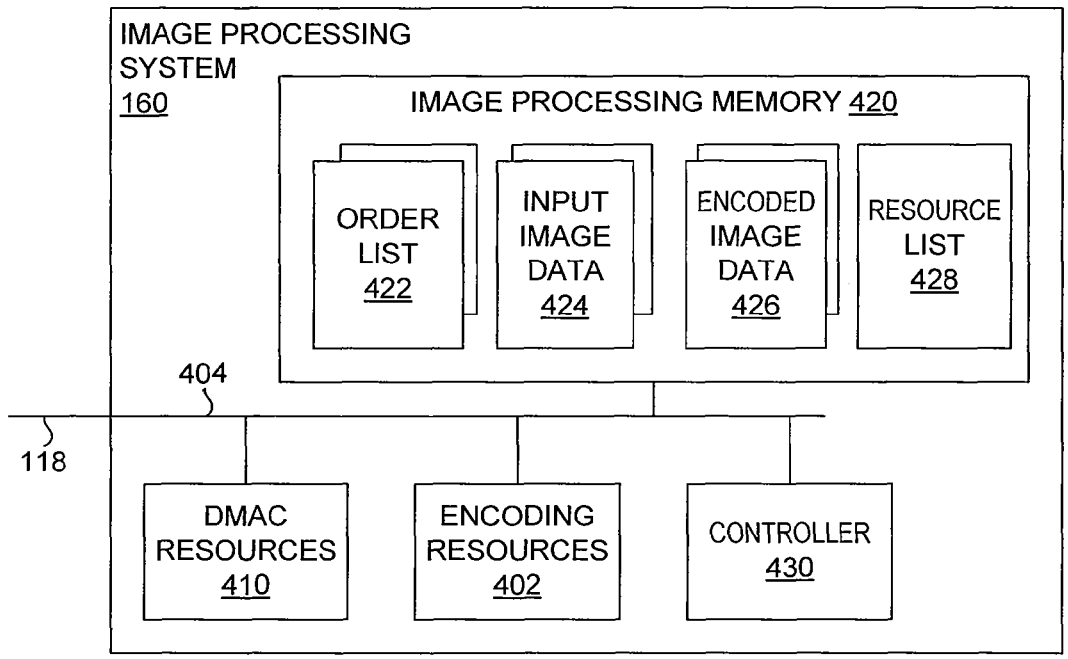
FIG. 4 illustrates selected details of an embodiment of an image processing system enabled to encode multiple image sequences.

In some embodiments, communications resource availability, such as network bandwidth and encoding resource availability, is provided by image transfer device 116 to transfer scheduler 130 to aid timing and prioritization of image capture from memory 112. An embodiment of image processing system 160 is depicted in FIG. 4 and described in the corresponding text herein. In an embodiment, network interface 170 provides compatibility with the network 180 by executing a reliable protocol stack such as TCP/IP and/or UDP/IP. In addition to enabling the communication of image sequence data and other remote computer-related data, the network interface 170 provides information relating to network components such as network capacity, availability information or queue fill levels associated with the network interface 170 to image processing system 160 or transfer scheduler 130. In one or more embodiments, the network interface 170 is coupled to a system bus of processor 110 or directly to image processing system 160.

In various embodiments, processor 110, memory 112, system 160, and interface 170 are coupled with the aid of support circuits 114. Support circuits 114 include at least one of north bridge, south bridge, chipset, power supplies, clock circuits, data registers, I/O interfaces, and network interfaces. In other embodiments, support circuits 114 include at least one of address, control, interrupt and/or data connections, controllers, data buffers, drivers, repeaters, and receivers to enable appropriate communications between processor 110, memory 112, processing system 160, and interface 170.

In some embodiments, support circuits 114 further incorporate hardware-based virtualization management features such as emulated register sets, address translation tables, interrupt tables, PCI I/O virtualization (IOV) features and/or I/O memory management unit (IOMMU) to enable DMA operations between image sequence memory 144 and image processing system 160.

According to various embodiments, interconnect 118 is, for example but not limited to, one or more buses such as a Peripheral Component Interconnect (PCI) bus, a PCI-EXPRESS bus, a HYPERTRANSPORT bus, DVI bus, DisplayPort bus or other wired, optical or wireless connections, as is known in the art. Interconnect 118 has additional elements, such as controllers, data buffers, drivers, repeaters, and receivers, to enable communications but omitted from FIG. 1 for clarity. Further, interconnect 118 includes address, control, interrupt and/or data connections to enable appropriate communications among the aforementioned components.

The network 180 comprises a communication system (e.g., the Internet, local area network (LAN), wide area network (WAN), and the like) that connects computer systems completely by wire, cable, fiber optic, and/or wireless links facilitated by various types of well-known network elements, such as hubs, switches, routers, and the like. In one embodiment, the network 180 may be a shared packet switched network that employs various well-known protocols (e.g., TCP/IP and the like) to communicate information amongst the network resources. For example, in various embodiments, the network 180 employs part of the Internet.

Remote computer 190 is generally any form of computing device that can display or store image data and connect to network 180. For example, in an embodiment, remote computer 190 is a terminal in a networked computer system (e.g., in an embodiment, system 100 is a remote computing system). Such remote terminals include thin clients, personal computers, workstations, Personal Digital Assistants (PDAs), wireless devices, storage systems and the like. In some embodiments, remote computer 190 comprises an image decoder that decodes image information for presentation on display 192. In other embodiments, remote computer 190 also comprises one or more peripheral devices such as mouse, keyboard and/or other well known peripherals and computer 190 presents a remote Graphical User Interface (GUI) on display 192.

Display 192 is any screen type device (e.g., liquid crystal display (LCD), cathode ray tube (CRT), plasma display, and the like) that displays images. In some embodiments, the remote computer 190 connects to a plurality of displays, for example using multiple separate display connections such as Digital Visual Interface (DVI) or a multiplexed display connection such as DisplayPort.

FIG. 2 illustrates selected details of an embodiment of an update manager 146 depicted in FIG. 1 which provides select display controller timing functions to drawing software, maintains image change information used to specify to the image transfer device 116 (ref. FIG. 1) which image portions to capture, and maintains image status information used by transfer scheduler 130 (ref. FIG. 1) and/or image processing system 160 to determine timing requirements for image copy operations. In some embodiments, image transfer requirements are communicated by the update manager 146 to transfer scheduler 130, which compiles DMA transfer lists based on collective transfer priorities. In other embodiments, image transfer requirements are communicated by the update manager 146 to a controller of image processing system 160 (FIG. 1) which determines the collective transfer priorities and compiles the DMA transfer lists.

In an embodiment, drawing command analyzer 202 inspects drawing commands, rendering operations or video commands issued by the operating system or application software to rendering software or a GPU.

Analyzer 202 extracts image change information, such as the exact location of pixels in sequence memory 144 (ref FIG. 1) updated by the drawing commands, and stores this as image change information 210. In an embodiment, image change information 210 comprises a dirty mask corresponding to sequence memory 144 indicating pixels, blocks, lines or other defined areas that changed since the previous image capture operation.

In various embodiments, analyzer 202 extracts image type information (such as video type, picture type, text type or background type), display refresh rate, window manager state information (e.g., information related to the state of MICROSOFT VISTA DESKTOP WINDOW MANAGER), and current draw state from the drawing commands. Analyzer 202 derives image status from this information which is stored as state information 220, for example as a table comprising image status information for defined frames, blocks and/or other image surfaces of image sequence memory 144.

In various embodiments, the current draw state is monitored to prevent the capture and communication of partially drawn image regions which results in visible display tearing. In some such embodiments, the optimum time to perform image copy operations for a composed display image is determined by recognizing drawing completion commands such as completion of OpenGL "Swapbuffer" or "Flushbuffer" commands. Draw state for off-screen buffers, windowed image areas or other defined pre-composed image buffers is determined by recognizing the completion of canonical commands such as window updates.

In other embodiments, analyzer 202 determines update rates for an image frame, window or other region of a display image by tracking the temporal frequency of image updates.

In an embodiment, state information 220 comprises image status determined by the analysis of drawing commands and other VM state information useful in determining display update priorities. For example, in an embodiment, state information comprises pointer information, such as pointer location information, so that image regions associated with pointer location or activity receive update priority. In another embodiment, state information 220 comprises cursor location information so that image regions associated with Human Interface Device (HID) events/activity, such as keyboard events, receive update priority.

In an embodiment, drawing command sequencer 230 influences image update operations by manipulating drawing commands prior to execution. For example, in an embodiment, analyzer 202 or sequencer 230 extracts commands from the command queue. The extracted commands are then delayed, re-ordered or modified based on the timing of image copy operations initiated by transfer scheduler 130 in FIG. 1. As one example, to prevent tearing, drawing commands associated with a region of sequence memory 144 are delayed if the associated pixel update operation conflicts with the timing of copy operations for the same pixel locations. As another example, in the presence of an upcoming region copy operation, only the commands that affect change immediately prior to the copy operation are enabled for execution by drawing software while older commands with ineffectual changes are purged from the queue to free drawing resources for other processes.

In another embodiment, sequencer 230 suspends the drawing thread, for example by sending it to 'sleep' immediately following a frame or region update operation, freeing processing resources to execute other processes during the period that the frame or image region is being copied and optionally until an updated image is required by the image transfer device 116 in FIG. 1.

In an embodiment, timing function 240 provides select display controller information, such as frame timing, to drawing software. In an embodiment, timing function 240 emulates a Vertical Synchronization (VSYNC) interrupt signal which is triggered immediately after sequence memory 144 in FIG. 1 has been copied. In some embodiments, image processing system 160 in FIG. 1 generates a VSYNC signal after a copy operation which is vectored to update manager 146. In other embodiments, transfer scheduler 130 in FIG. 1 provides a transfer timing requirement to update manager 146. In another embodiment, a semaphore is passed between transfer scheduler 130 in FIG. 1 and the update managers 146. When the transfer scheduler 130 owns the semaphore, drawing updates are suspended to enable tear-free copy operations. When the update manager owns the semaphore, drawing updates continue.

In other embodiments, a GPU generates a VSYNC signal which is distributed to the update manager $146_1$ and $146_2$ and used as a time base. In other embodiments, the display refresh rate of display 192 is determined (for example by determining the display attributes) and used to specify the timing interval of an emulated local VSYNC interrupt. In a select embodiment, an endpoint such as one of remote computer 190 generates a display timing signal and display timing information is communicated back to timing function 240 so that drawing operations and/or image capture can be timed to meet the remote timing requirements. In other embodiments, timing function 240 uses operating system timing as a basis for determining timing of frame or region updates. In other embodiments, timing function 240 extracts audio timing information from audio software associated with application software 142 to enable alignment between frame timing and audio signals which ensures lip synchronization is maintained. In another select embodiment, the endpoint returns audio timing information back to timing function 240.

In an embodiment, change detect function 250 comprises image memory update detection means such as a memory access trap. In an exemplary embodiment in which processor 110 coupled to memory 112 comprises hardware-assisted virtualization features such as an INTEL VT technology, function 250 comprises machine-executable instructions enabled to program the Memory Management Unit (MMU) to generate exceptions whenever drawing software updates the image sequence memory. Exceptions are trapped in hypervisor 120 or VM 140 for analysis to determine which areas of the frame buffer have been updated. In one embodiment, memory access instructions are modified such that change detect function 250 is enabled to record sequence memory update operations.

FIG. 3 illustrates selected details of an embodiment of transfer scheduler 130 shown in FIG. 1 enabled to prioritize the transfer of image information from image sequence memory 144 in FIG. 1 to the image transfer device 116, also depicted in FIG. 1.

In an embodiment, transfer scheduler 130 comprises resource association and allocation information 302 such as a table that maintains and tracks associations between the image data of image sequence memory 144 and various resource attributes such as display attributes, user attributes or attributes of communication resources so that communication resource utilization can be managed on at least one of a per VM basis, a per-user basis or a per-endpoint basis.

In an embodiment, user priority attributes are used to prioritize display updates according to priority assigned to the application or user of a VM, for example a CAD application user may be assigned a higher transfer priority than a user of a word processing application to ensure responsive performance of the CAD software. As another example, a video application is assigned a lower priority to ensure fair network bandwidth allocation.

In another embodiment image type attributes (such as picture type, video type, text type etc. determined by drawing command analysis) are associated with image frames or regions of image sequence memory 144 so that the usage of shared communication resources is optimized. For example, an embodiment of image transfer device 116 in FIG. 1 comprises different queues associated with different shared encoding resources (e.g., one or more shared lossless encoders, one or more shared video encoders, one or more shared progressive image transfer (PIT) encoders etc.) and the transfer of image updates is prioritized according to the availability of the shared encoding resource as required by the image type to be transferred.

In other embodiments, the general availability of communications resources such as I/O bus availability, network bandwidth availability, remote connection availability, remote connection performance, memory or processing resource availability of image processing system 160 in FIG. 1 or network interface 170 of FIG. 1 is tracked in order to determine transfer priorities. In one such embodiment, communication resource information is periodically received from image processing system 160, network interface 170 and/or any other shared or individual communication resources, such as a busy signal received from a bus interface. In some such embodiments, available communications resources are prioritized in conjunction with the prioritization of image sequence transfers. In an embodiment, a small lower priority update of small memory footprint is scheduled ahead of a higher priority update with a larger memory footprint in the presence of temporary constrained image processing memory availability. In another embodiment, an image update associated with an available high bandwidth LAN connection to a remote computer is prioritized over an image update associated with a congested WAN connection to a second remote computer.

In an embodiment, transfer scheduler 130 comprises image sequence priority list 310, for example an ordered list of transfer priorities based on at least one of image status, resource allocation as determined from resource association and allocation information 302, user priority, image update preferences, content-based priority (for example based on image type), display refresh priority or a sequenced schedule requirement (such as a constant frame rate demanded by a video application). An embodiment of a method for scheduling the transfer of image updates is depicted in FIG. 6 and described in the associated text herein.

In an embodiment, transfer scheduler 130 comprises Update Manager Interface 320 to update managers $146_1$ and $146_2$ (and other update managers in embodiments with additional VMs). Update Manager Interface 320 receives image status information, for example a list of presentable (i.e., "ready" for communication) tear-free image frames or other image surfaces of image sequence memory. In various embodiments, the image status information is communicated using a shared memory structure or virtual communication channel known to the art. In an embodiment, Update Manager Interface 320 also communicates transfer timing information to the update managers, for example as a simple semaphore indicating immediate transfer timing or a timing schedule indicating future transfer timing requirements.

In some embodiments, transfer scheduler 130 predicts future communications resource availability based on communications resource usage history stored in transfer history table 330. For example, in an embodiment, a video application periodically updates image sequence memory 144 and update manager 146 periodically indicates to transfer scheduler 130 the availability of a presentable tear-free video image frame. Transfer scheduler 130 monitors the resource allocation associated with encoding and communicating the periodic image sequence and is enabled to schedule future image transfers associated with other images in conjunction with a reserved communications resource allocation for the predicted video sequence.

In an embodiment, transfer scheduler 130 comprises hypervisor scheduler interface 340 enabled to indicate VM scheduling preferences (as determined by transfer scheduler 130) to scheduling software of hypervisor 120. As one example, interface 340 indicates that a VM should be de-queued or de-prioritized once a presentable image is available in order to prevent additional drawing operations ahead of the image transfer. As another example, a de-scheduled VM is prioritized for service ahead of an expected frame update requirement associated with a periodic video image sequence or remote display refresh timing requirement. As another example, a de-scheduled VM is prioritized for service when peripheral device data associated with the VM is detected by network interface 170 in FIG. 1.

In an embodiment, transfer scheduler 130 comprises transfer system interface 350 to image transfer device 116 in FIG. 1 for receiving transfer status information and communicating image transfer requirements, typically comprising image availability information and other attributes such as transfer history, image generation history, user input events or image type information useful in determining transfer priorities. Such transfer status information is received from update manager 146 on interface 320. In some embodiments, interface 350 receives current communications resource information comprising at least one of shared resource availability (e.g., shared encoder resource availability or I/O bus availability), individual resource availability (e.g., remote connection availability), memory availability, current encoded queue depth information, or communications error information. In some embodiments, the transfer scheduler compiles one or more DMA transfer lists comprising memory addresses and current transfer priorities of image regions in image sequence memory 144 based on the current transfer priority of sequence priority list 310. These DMA transfer lists are communicated to DMAC resources associated with the image transfer device 116. In an embodiment, the list indicates updated areas of image sequence memory 144 in a state presentable for transfer. In some embodiments, one or more of the functions described for transfer scheduler 130 such as resource allocations 302, image sequence priority list 310 and transfer history 310 are executed by a controller of image processing system 160. In some such cases, the image processing system 160 receives state information and image change information from the update manager 146 and generates communication schedules stored as processing order list 422 in FIG. 4 described below.

In select embodiments, transfer scheduler 130 comprises means for determining the timing associated with the completion of image sequence transfers onto the network or to a remote endpoint, such as a transfer completion flag (TCF) 360. Transfer completion flag 360 enables a schedule for the encoding and transfer of new image updates to be coordinated with the completion of previous transfers. In one exemplary case, transfer completion flag 360 is set when a queue monitor that monitors the depth of the network transmit queue or the encoded output image queue registers a specified network transmit queue depth. In a second exemplary case, transfer completion flag 360 is set when a transfer completion signal is received from the remote computer.

FIG. 4 illustrates selected details of an embodiment of an image processing system 160 that captures image updates from image sequence memory (ref. memory 144 in FIG. 1), encodes the updates and operates in conjunction with network interface 170 in FIG. 1 to communicate encoded image data to communication endpoints such as remote systems for display.

In an embodiment, image processing system 160 comprises encoding resources 402 and DMAC resources 410 coupled to image processing memory 420 by local interconnect 404 and coupled to communication bus 118 of computer 102 in FIG. 1. In various embodiments, processing system 160 further comprises controller 430 for managing encoding and communications functions and providing transfer status information to transfer scheduler 130 in FIG. 1.

In some embodiments, a means to obtain image updates comprises the DMAC resources 410; alternatively, the means to obtain image updates may comprise DMAC resources associated with at least one of processor 110, a chipset associated with processor 110 or image processing system 160, the DMAC resources coupled between memory 112 and image processing memory, and further operating in conjunction with transfer scheduler 130 and update manager 146 described. In a select embodiment, the means to obtain image updates comprises one or more sets of machine readable instructions executed by processor 110 enabled to write image updates to image processing system 160.

According to various embodiments, bus 404 is one or more of: a Peripheral Component Interconnect (PCI) bus; a PCI-EXPRESS bus; a HYPERTRANSPORT bus; an Advanced Microprocessor Bus Architecture (AMBA®) bus; and any other connections, including wired, wireless, and optical connections, for coupling image encoder resources. In some embodiments, bus 404 includes communications elements, such as controllers, data buffers and/or registers, drivers, repeaters, and receivers. In some embodiments, bus 404 includes address, control, and data connections to enable communications among components. According to various embodiments, bus 404 is one or more of: independent of bus 118 in FIG. 1; a same bus as bus 118; a part of bus 118; bridged to bus 118; and communicatively coupled to bus 118.

Encoding resources 402 performs image encoding operations, such as one or more of image analysis (e.g., image type decomposition), image transform functions, text encoding, picture encoding, background encoding, progressive quantization, and binary encoding. In some embodiments, encoding resources 402 is implemented, at least in part, as a set of computer-executable instructions. According to various embodiments, encoding resources 402 includes one or more of: a programmable embedded digital media processor, such as a TMS320DM64x DaVinci™ digital media processor available from TEXAS INSTRUMENTS; a PNX1300 NEXPERIA processor from NXP Semiconductors; a Field Programmable Gate Array (FPGA) or an Application Specific Integrated Circuit (ASIC) configured, at least in part, as a logic circuit to perform image encoding; other processors and/or electronic hardware suitable for performing image encoding; and any combination of the foregoing.

Generally, encoding resources 402 comprises a set of independent and/or shared image encoding elements enabled to apply one or more encoding techniques to a plurality of independent image updates, display surfaces or frames associated with independent operating environments (ref. environments VM $140_1$ and VM $140_2$ in FIG. 1). The term "shared" encoding resource refers to a pooled encoding resource available for the encoding of multiple image sequence memories (ref. memory $144_1$ and memory $144_2$) but susceptible to periods of unavailability when loaded. The term "independent" encoding resource refers to an encoding resource associated with one or more image sequence memories operating as a dedicated or multiplexed imaging pipeline.

In some embodiments, encoding resources 402 comprises one or more independent or shared decomposition filters that decomposes image frames, sub-frames such as blocks or other defined image regions into different image types such as background, text, picture, video or object layers based on spatial and temporal features such as contrast, color content or other suitable parameters. According to some embodiments, images are further decomposed into different layers based on text recognition methods known to the art or analysis of drawing commands executed by processor 110 in FIG. 1, such drawing commands providing attributes that enable image areas to be classified as video, text, background, icons, photographs or other elements typical of a graphic user interface. In some embodiments, encoding resources 402 comprises one or more independent or shared lossless encoders such as at least one of a Golomb encoder, Rice encoder, Huffman encoder, variable length encoder (VLC), context-adaptive VLC or context-adaptive binary arithmetic encoder (CABAC)). In some embodiments, encoding resources 402 comprises one or more independent or shared lossy encoders such as at least one of a wavelet encoder, a DCT encoder, an MPEG encoder or a JPEG encoder.

The image processing memory 420 comprises random access memory such as Dynamic Random Access Memory (DRAM), synchronous DRAM or video DRAM, read only memory, removable disk memory, flash memory, and various combinations of these types of memory. According to various embodiments, memory 420 comprises processing order list 422, input image data 424, encoded image data 426 and resource list 428 in addition to general data structures including intermediate encoding results and state information, registers and machine-readable instructions associated with the execution of image encoding operations. In some embodiments, memory 420 stores one or more DMA transfer lists executed by DMAC resources 410. In some embodiments, at least part of memory 420 is distributed, for example coupled to specified encoding resources.

In various embodiments, processing order list 422 received from transfer scheduler 130 in FIG. 1 specifies the order in which portions of image sequences are obtained from image sequence memory (ref memory 144 in FIG. 1) and processed by processing system 160. In some such embodiments, processing order list 422 further identifies one or more regions of image sequence memory (ref memory 144 in FIG. 1) by specific address (for example in the form of one or more DMA lists) for processing by DMAC resources 410.

In an embodiment, DMAC resources 410 comprise one or more image capture resources, such as one or more DMA engines, that copy image updates from sequence memory 144 to input image data region 424 of memory 420 by executing one or more DMA transfer lists as prioritized by processing order list 422. In another embodiment, DMAC resources 410 transfer image updates directly to encoding resources 402 without intermediate storage. In some such embodiments, encoding resources 402 performs in-line pre-processing functions such as image analysis (for example, change detection processing) before storing selective input image data 424.

In an embodiment, encoded image data generated by encoding resources 402 is stored as encoded image data 426 of image processing memory 420, for example as one or more output image queues, each image queue associated with a different communication endpoint such as one of the remote computers 190 in FIG. 1. The encoded image data is accessed by the network interface (ref interface 170 in FIG. 1) and communicated across the network. In one alternative embodiment, the encoded image data 426 is located in memory associated with the network interface 170. In another alternative embodiment, image processing system 160 comprises a dedicated network interface independent of other network interface resources associated with computer 102 in FIG. 1.

Controller 430 is generally an embedded microcontroller or microprocessor such as an Advanced RISC Machine (ARM), Microprocessor without Interlocked Pipeline Stages (MIPS) or another type of embedded processor tasked with initializing image processing system 160, allocating local resources, managing communications errors, and reporting image transfer status, error conditions and communication resource availability information back to transfer scheduler 130 in FIG. 1. In some embodiments, at least part of the encoding resources 402 are executed as machine-readable instructions by controller 430. In some embodiments, controller 430 receives network status information such as bandwidth availability, error statistics, transmission latency or other network-related information from network interface 170 in FIG. 1. Network status information is used to adjust transfer priorities according to general network or specific connection loading.

In various embodiments, controller 430 maintains resource list 428 comprising a list of shared encoding resources, availability information based on current encoder loading and image transfer status associated with in-queue image updates for example including transfer latency associated with image data 424 and image data 426. Resource availability information and image transfer status is conveyed to transfer scheduler 130 in FIG. 1 to enable prioritization of subsequent image updates.

In some embodiments, display attributes such as display refresh timing are provided to image processing system 160 by remote computer 190 in FIG. 1 or the associated VM (ref. VM 140 in FIG. 1). In some such embodiments, controller 430 is enabled to provide a display update time base for computer 102, for example by providing a VSYNC interrupt or alternative display timing signals to processor 110.

Figure 5:
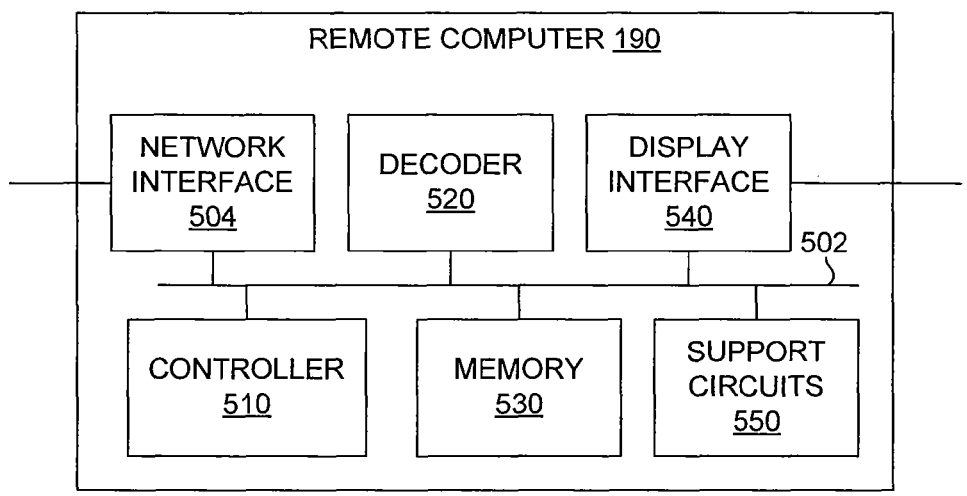
FIG. 5 illustrates selected details of an embodiment of a remote computer enabled to display one or more image sequences.

FIG. 5 illustrates selected details of an embodiment of a remote computer 190 enabled to receive one or more encoded image sequences comprising image updates, and enabled to display a decoded version of the image sequence(s). As illustrated in FIG. 5, an embodiment of remote computer 190 includes network interface 504, controller 510, decoder 520, memory 530, and display interface 540, communicatively coupled by bus 502. In some embodiments, remote computer 190 is implemented, at least in part, as a processor, a computer system, and/or a programming or a processing environment configured to receive and to decode an image sequence, or multiple image sequences as in the case of an embodiment comprising multiple displays.

According to various embodiments, remote computer 190 further comprised one or more of: Human Interface Devices (HIDs) such as mouse and keyboard; peripheral components, such as microphones or speakers; other interfaces, such as a USB interface; and other components, interfaces, and/or connections associated with computer systems, desktop computers, and/or processors. In some embodiments, remote computer 190 is implemented as a stand-alone system, such as a thin client or a desktop computer. In some embodiments, such as some stand-alone embodiments, remote computer system 190 also includes mechanical housing components, connectors, power supplies, and other components not illustrated in FIG. 5. In various embodiments, remote computer 190 is a processing module integrated in an appliance, such as a phone or a display. In such integrated embodiments, remote computer 190 is optionally configured to use resources, such as power supply and mechanical support components, provided by the appliance or the display.

According to various embodiments, bus 502 is one or more of: a Peripheral Component Interconnect (PCI) bus; a PCI-Express™ bus; a HyperTransport™ bus; an Advanced Microprocessor Bus Architecture (AMBA®) bus; and any other connections, including wired, wireless, and optical connections, for coupling components of remote computer 190. In some embodiments, bus 502 includes communications elements, such as controllers, data buffers and/or registers, drivers, repeaters, and receivers. In various embodiments, bus 502 includes address, control, and data connections to enable communications among components of remote computer 190. According to various embodiments, bus 502 is one or more of: a single bus; a plurality of independent busses, with some of the components of remote computer 190 coupled to more than one of the independent busses; a plurality of bridged busses; a fabric, such as HyperTransport™ or InfiniBand™ and any other one or more busses configured to couple the components of remote computer 190.

In some embodiments, network interface 504 provides communicative coupling between remote computer 190 and host computer 102 of FIG. 1 using network 180 of FIG. 1. Network interface 504 receives encoded image information and stores it in memory 530 prior to decoding. At network access and lower protocol levels, network interface 504 sends and receives electrical, electromagnetic, and/or optical signals that carry data, such as digital data streams, representing various types of information. In some embodiments, network interface 504 supports protocol stacks for network communications, such as TCP/IP, UDP/IP and/or encryption protocols.

In various embodiments, controller 510 provides control and/or management functions for remote computer 190. In some such embodiments, controller 510 includes one or more of: a microcontroller, such as those manufactured by Microchip; a 32-bit CPU; a 64-bit CPU; an AMD CPU, such as an Opteron™ or Athlon™ CPU; an Intel CPU, such as a Peryn™, Xeon™ or Pentium™ or other x86 CPU; a SPARC™ microprocessor, such as those manufactured by Sun Microsystems Inc.; a PowerPC™ microprocessor, such as those manufactured by Motorola or IBM; and any other processor or computing device. In some embodiments where remote computer 190 includes an ASIC or an FPGA, controller 510 comprises an embedded processor, such as an X86 class, MIPS, an ARM, or another type of embedded processor.

According to various embodiments, controller 510 initializes one or more of: bus 502, network interface 504, decoder 520, memory 530, display interface 540, and other components of remote computer 190. In some embodiments, controller 510 establishes a management connection with host computer 102 of FIG. 1 to enable communication of management information, such as image build state, status updates and error reports. For example, in some embodiments, network interface 504 provides, at least in part, a first network connection (such as a TCP/IP socket) for receiving image data, and a second network connection for the management connection. In some embodiments, the image build state is sent along with the image data on the first network connection. In other embodiments, the image build state is sent, at least in part, on the management connection. In other cases, timing information such as transfer completion, audio timing or display timing information is returned to the host computer 102 on the management connection.

In various embodiments, decoder 520 performs image decoding, such as decoding of image updates, frames or sequences. In some embodiments, decoder 520 performs operations such as binary decoding, inverse image transformation such as inverse wavelet or inverse DCT transformation and/or video decoding. In further embodiments, decoder 520 is implemented, at least in part, as a set of computer-executable instructions. According to various embodiments, decoder 520 includes one or more of: a programmable embedded digital media processor, such as a TMS320DM64x DaVinci™ digital media processor available from Texas Instruments; a PNX1300 Nexperia™ processor from NXP Semiconductors; a Field Programmable Gate Array (FPGA) or an Application Specific Integrated Circuit (ASIC) configured, at least in part, as a logic circuit to perform image decoding; and other processors and/or electronic hardware suitable for performing image decoding; software executing on and/or in conjunction with a processor, including any of the foregoing; and any combination of the foregoing.

In some embodiments, decoder 520 includes binary decoding resources performing one or more of: entropy arithmetic decoding; and a lossless data decompression technique. In further embodiments, the operation of the binary decoder is complementary to binary encoding performed by image processing system 160 in FIG. 1. According to various embodiments, the binary decoder is implemented as one or more of: a logic circuit; software executed on a processor; and any combination of the foregoing. In some embodiments where binary decoding is implemented, at least in part, in software, at least some functions are executed as a set of instructions by controller 510 or a processor of remote computer 190. In some embodiments where a binary decoder is implemented, at least in part, as a logic circuit, the binary decoder resource is physically co-located with decoder 520, such as by being on a same integrated circuit.

In some embodiments where remote computer 190 includes a processor (such as a CPU, a microprocessor, a microcontroller, or a programmable media processor), resources of the processor are used, at least in part, to implement one or more functions of components of remote computer 190, such as functions of network interface 504, decoder 520 and display interface 540.

According to various embodiments, memory 530 includes one or more of: electronic, magnetic, optical, and/or other types of storage media; volatile computer-readable media, such as RAM, DRAM, and SRAM; and nonvolatile computer-readable media, such as ROM, hard drive, tape, CDROM, DVDROM, magneto-optical disks, EPROM, EEPROM, Flash EPROM. In various embodiments, memory 530 stores information such as received image update information, decoded image information, decoded raster image information in a format accessible to display interface 540, and information associated with controller 510, such as software and/or data used by controller 510. In further embodiments, memory 530 includes a type of ROM or other non-volatile media used to store software, such as programs or firmware, executed by controller 510. In various embodiments, memory 530 is partitioned and/or distributed into system and frame buffer partitions, wherein the frame buffer partition is accessible by display interface 540. In various embodiments, memory 530 uses different busses for coupling with network interface 504, controller 510, decode 520, display interface 540, and/or other components of remote computer 190. In further embodiments, memory 530 includes control logic for arbitrating access to memory 530 among the components of remote computer 190.

Display interface 540 accesses display information, such as decoded raster image information, from memory 530, and provides a display signal, such as a raster signal, for display 192 in FIG. 1. In some DVI embodiments, display interface 540 includes line driver circuitry such as Transition-Minimized Differential Signaling (TMDS) circuitry. In some Video Graphics Adapter (VGA) embodiments, display interface 540 includes one or more VGA controllers. In other embodiments, display interface 540 comprises multiple display interfaces using at least one of multiple DVI interfaces, multiple VGA interfaces, one or more multiplexed Digital Packet Video Link (DPVL) interfaces or one or more DisplayPort interfaces.

In some embodiments, display interface 540 determines attributes of display 192 in FIG. 1 such as refresh timing requirements which are returned to computer 102 in FIG. 1 so that the timing of image updates and/or rendering operations can be emulated accordingly.

Support circuits 550 include at least one of power supplies, clock circuits, data registers, I/O interfaces, network interfaces, and the like. The support circuits 550 support the functionality of bus 502, network interface 504, decoder 520, memory 530, display interface 540, and other components of remote computer 190.

In some embodiments, remote computer 190 comprises a storage system interface such as a Redundant Array of Inexpensive Disks (RAID), Small Computer System Interface (SCSI), FIREWIRE, Integrated Drive Electronics (IDE), INFINIBAND, Ethernet interface or the like enabled to store at least one of encoded or decoded image updates from computer 102 in FIG. 1. In some such embodiments, computer 190 further comprises storage resources such as hard drive, tape, CDROM, DVDROM, magneto-optical disks or the like suitable for image storage.

In some embodiments, various combinations of all or portions of functions performed by a computer (such as computer 102 or remote computer 190 of FIG. 1), including image processing system 160 of FIG. 1 and decoder 520 of FIG. 5, and portions of a processor, a microprocessor, or a programmable controller providing all or portions of the aforementioned functions, are specified by descriptions compatible with processing by a computer system (e.g., Verilog, VHDL, or any similar hardware description language). In various embodiments the processing includes any combination of interpretation, compilation, simulation, and synthesis to produce, to verify, or to specify logic and/or circuitry suitable for inclusion on an integrated circuit. The integrated circuit, according to various embodiments, is designed and/or manufactured according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

FIG. 6 illustrates an embodiment of a process 600 for communicating multiple image sequences such as remote desktop display images or other image sequences from image sequence memory $144_1$ and $144_2$ in FIG. 1 to computers $190_1$ and $190_2$ in FIG. 1.

Process 600 starts ("Start" 602) and proceeds to step 610 ("Determine and Prioritize Resources"). According to various embodiments step 610 comprises determining the availability of shared and/or individual communications resources required to communicate image data associated with one or more image sequences. In some embodiments, the availability of such resources is determined and the resources prioritized; in other embodiments, the availability of such resources is determined but the resources are not prioritized and in other embodiments the availability of resources is assumed and process 600 bypasses step 610 and proceeds to step 620.

Examples of shared communications resources comprise image processing resources, encoding resources, memory, data busses, and the like. Such shared communication resources are used on a time-sharing basis to support the communication of image sequences associated with different virtual machines. In an embodiment, an image processing system such as processing system 160 in FIG. 1 comprises shared purpose-tuned encoding resources such as an encoding pool comprising one or more picture image type encoders, one or more video image type encoders, one or more text type encoders and one or more lossless encoders used to encode identified image types associated with image sequences of different virtual machines. Other embodiments comprise other combinations of purpose-specific encoder types. In some embodiments, one or more network queues, network segments or the bandwidth associated with shared network queues, segments or connection between the host computer and the remote computers is shared, for example under management of a traffic shaping resource.

Individual communications resources comprise resources required to communicate part of any one image sequence, for example image processing resources, memory, DMAC resources, network queues and the like for communicating any one image sequence. In some embodiments, such as a WAN connection used as a shared resource comprising multiple VLAN overlays, each VLAN is associated with a different connection to a different remote computer. In some such embodiments, each VLAN is managed as a separate individual resource, for example by managing the bandwidth associated with the VLAN.

In various embodiments, both shared and individual communications resources are subject to communications bottlenecks and therefore are factors in prioritizing communications. In the case of shared resources, the processing of different image sequences must be scheduled to optimize the usage of the resource and prevent excessive pre-processing queue depth which causes latency and communication of obsolete image data. In an embodiment, future usage requirements (e.g., availability) of shared resources is predicted, for example based on determined image generation history or historic usage patterns including frequency and duration of usage (e.g., in the case of an image sequence comprising video content generated at a predictable video frame rate, a video encoding resource may be required at the predicted periodic schedule). In some embodiment, generation of image sequence portions is controlled based on some or all of the predicted availability information.

In the case of an individual resource such as a low bandwidth WAN connection to a remote computer, excessive queuing results in both added latency and transmission of out-of-date content. By minimizing the depth of the output queue to the network and minimizing the delay between when an image is updated by software and when it is captured, the transmission of out-of-date image data is limited or avoided.

Process 600 proceeds to step 620 ("Determine and Prioritize Ready Portions"). According to select embodiments, step 620 comprises determining which portions of which image sequences are available for communication; e.g., the generation of updates to each image sequence may be independently monitored to determine the available image portions. In some embodiments, an image portion is deemed "available" (or "ready" for communication) when a frame buffer in image sequence memory that maintains the image portion has been updated since the previous version of the image portion, generally at the same location, was captured and communicated.

In other embodiments, an image portion is deemed "available" based on an update status indication that the image portion is in a tear-free state, for example as determined by a period of inactive image generation, interpretation of drawing commands, or analysis of update location information (e.g., completion of a raster update). In other embodiments, the update status indicates when all image updates associated with the generation of a static image have been completed so that tear-free capture is enabled.

In other embodiments, the update status indicates capture timing (i.e., tear-free image availability) immediately following temporary suspension or re-ordering of drawing operations or commands.

In other embodiments, an image portion is deemed ready for communication by monitoring image update timing and/or image update location. In some such embodiments, an image region is ready for communication immediately following an update. In another such embodiment, the image region is predicted to be ready for communication based on a history of previous periodic updates by drawing software.

In further embodiments, the elapsed time period between when a region of a frame buffer is updated and when the region of the frame buffer is communicated is monitored. When a region is updated and a determined period of time has elapsed, it is deemed ready for communication. In other embodiments, different regions of different image sequences are prioritized based on the elapsed time between update and capture for each image sequence.

In some embodiments in which image portions associated with different image sequences are all ready, the image sequences are prioritized for communication and selected using one or more prioritization metrics such as communication or communication completion recentness, I/O recentness, update recentness, analysis recentness or a review of pending updates. In an embodiment, a communication recentness metric grants the most recently communicated portion the lowest priority and the least recently communicated portion the highest priority, an analysis recentness metric grants the portion most recently analyzed (for an image update) the lowest priority and the portion least recently analyzed the highest priority. A review of available or pending updates grants the image sequence with the oldest or most pending updates the highest priority. Numerous other prioritization metrics are contemplated such as granting image sequence priority based on the area of change, user administrative criteria, user input such as HID events (e.g., mouse movement), image content attributes, round robin priority, a network fairness priority, a display refresh priority, content update priorities, display configuration priorities and the like. In some embodiments, a single VM supports multiple image sequences, each sequence associated with a separate display of a multiple-display configuration (such as a desktop comprising a quad display configuration). In some such embodiments, different image portions associated with the same multiple-display configuration are granted similar or equal priority such that the entire system is updated at essentially the same time.

In other embodiments, image sequences are scheduled and image sequence priority granted based on predicted, estimated or previously determined communication timing requirements for each image sequence or updated portion ready for communication, including a prediction of when a resource will be available and how long the resource will be available. In some embodiments, the communication priority is based on the elapsed time since the image portion was deemed available for communication. In other embodiments, the priority is associated with the timing of anticipated updates. For example, an initial high priority decreases over time if the portion is not communicated, in anticipation of an imminent update of the portion. In some such cases, the portion will be overwritten by the update rather than being communicated once the priority has dropped too low compared to other outstanding priorities, resulting in a dropped portion or image frame. In some embodiments, the total communication timing comprises a component in which the image portion is captured (i.e., obtained from image sequence memory), a second component in which the image portion is encoded, and a third component in which the encoded image portion is transmitted. In one such embodiment, a small image update (for example, a small pointer update) associated with a first image sequence is prioritized over a large screen update (for example an entire display image change) associated with a second image sequence based on the shorter duration of the encoding time component associated with the first image update.

Process 600 proceeds to step 630 ("Communicate Prioritized Portion(s)"). According to various embodiments step 630 comprises selecting, capturing, encoding, and transmitting one or more image portions to a remote computer such as one of computers 190 in FIG. 1 based on image portion communication priorities established in step 620. In other various embodiments step 630 comprises selecting, capturing, encoding, and queuing one or more image portions for transmission based on image portion communication priorities established in step 620. In select embodiments, further updates are prevented (i.e., generation of the image sequence from which the image portion was selected is restricted) while an image portion is being captured, for example during an image DMA transaction. In some embodiments, priorities are frequently reviewed and re-established, for example immediately following the communication of one or more portions. In other embodiments, priorities are reviewed and re-established after most or all the prioritized image portions determined in step 620 are communicated. In other embodiments, priorities are reviewed in association with swapping out of virtual machines. On occasion, a previously "available" image portion becomes unavailable and is de-prioritized, for example during a subsequent update operation for that portion.

In some embodiments, process 600 proceeds to step 640 ("De-prioritize Image Sequence") in which subsequent drawing operations associated with the image sequence communicated in step 630 are de-prioritized or restricted. In an embodiment, the VM associated with the communicated image sequence is de-scheduled by scheduling software in the hypervisor. In another embodiment, the drawing thread of the VM associated with the image sequence is forced into a sleep mode for a determined period. In some such embodiments, the determined period is based on the timing of future expected updates (e.g., a video frame refresh period). In other embodiments, a recently communicated image sequence is not necessarily de-prioritized and process 600 proceeds directly to step 650.

Process 600 then proceeds to step 650 ("Status") in which method 600 either proceeds to step 660 ("End"), for example when all image sequences have been terminated or method 600 repeats from step 610 in case 652 if additional image information is available or expected to become available for communication.

Figure 7:
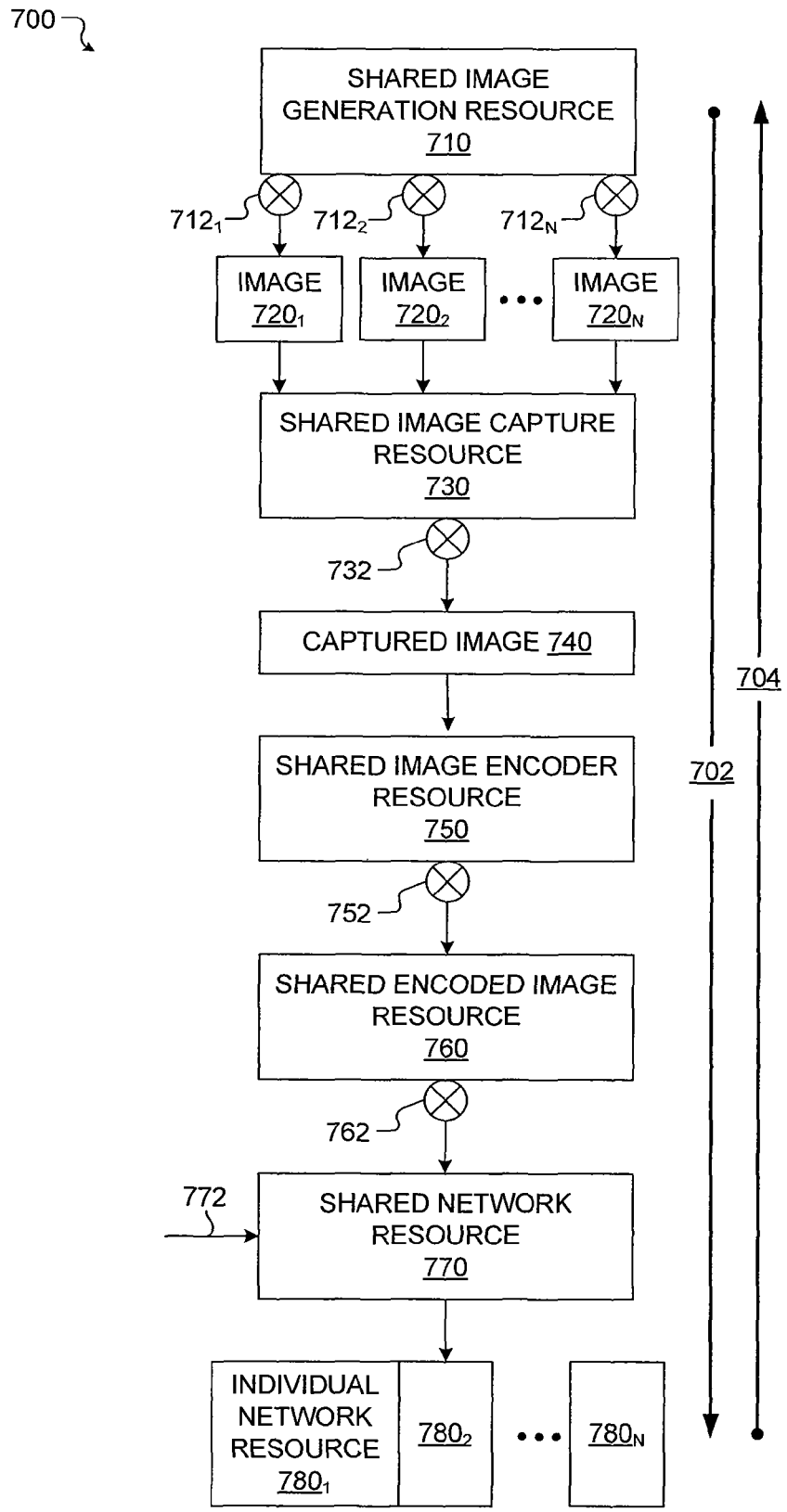
FIG. 7 illustrates control flows related to data, priorities and resources in the image processing path.

FIG. 7 illustrates control flow 700 related to data and resource control functions in the image processing path, including control flow for data and priorities in an egress direction 702 from image generation resources towards a network and including resource control flow in an ingress direction 704 from the network towards the image generation resources.

Image generation control functions $712_1$, $712_2$ and $712_N$ comprising, in an embodiment, update manager 146 in FIG. 1 are tasked with managing the generation of various corresponding source images $720_1$, $720_2$ and $720_N$ by shared image generation resource 710 comprising, in an embodiment, processor 110 and memory 112 in FIG. 1.

Individual image capture control function 732, comprising image transfer control resources such as transfer scheduler 130 in FIG. 1, is tasked with relocating individual images 720 to captured image 740 located in image processing memory, such as input image data 424 in memory 420 of FIG. 4 or an allocated area of memory 112. Control point 732 manages shared image capture resources 730, including shared resources such as shared cycles of processor 110, bus 118 (ref. FIG. 1) and DMAC resources (e.g., DMAC resources 410 of FIG. 4) to facilitate image relocation.

Individual image encode control function 752 comprising controller 430 in FIG. 4 manages shared image encoder resources 750 for encoding of captured image 740 and storage of the encoded image in shared encoded image resource 760 (i.e., image data 426 in memory 420 of FIG. 4 and/or network interface memory).

Individual network bandwidth control function 762 is tasked with managing the bandwidth allocated to each encoded image update utilizing shared network resource 770 in the presence of unrelated network traffic 772 utilizing shared network resource 770, and further in consideration of individual network resources $780_1$, $780_2$ and $780_N$ associated with each independent downstream image path to a remote computer 190 in FIG. 1 (e.g., independent WAN, LAN, and network resources associated with each remote computer).

Resource control flow in direction 704 generally communicates resource availability from the individual network resources 780 towards image generation resource 710 in order to optimize resource utilization and optimize data flow and processing priorities in the egress direction 702. By enabling a backpressure associated with resource availability, bandwidth consumption and priorities of egress data may be exactly matched to the available resources. As an exemplary case of a system comprising a host computer 102 in FIG. 1 connected to a remote computer 190 by a low-bandwidth WAN network, the network bandwidth constraint (i.e., a parameter of a network resource 780) is communicated up the resource control flow stack so that control functions 712, 732, 752 or 762 can take appropriate responsive action. In some embodiments, image generation control functions 712 associated with the constrained channel regulates the rate at which resource 710 generates images so that part of lower layer shared resources, such as image encoder resource 750, interconnect resources, and/or memory resources may be tasked with alternative priorities. In some cases, it is not practical to regulate image generation rate in which case image capture control function 732 is tasked with regulating the rate at which image 720 is captured. In other cases, image encode control function 752 regulates the rate at which captured image 740 is encoded. In other embodiments, image encode control function 752 regulates compression parameters responsive to individual network resource availability.

The following example embodiments, including at least some explicitly enumerated as "ECs" (Example Combinations), provide additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1. A method for communicating a plurality of image sequences comprising repeated acts of determining at least one portion of the plurality of image sequences comprises an available communication resource and image content ready for communication; and communicating at least one of the at least one portion of the plurality of image sequences; wherein at least one of the determining and the communicating is based on a first priority.

EC2. The method of EC1 further comprising de-prioritizing subsequent drawing operations associated with the communicated at least one of the at least one portion of the plurality of image sequences.

EC10. The available communication resource of EC1 comprising at least one of a shared communication resource or an individual communication resource.

EC10a. The method of EC10 where in the shared communication resource is unavailable for communicating other portions of the plurality of image sequences while performing the communicating.

EC11. The shared communication resource of EC10 comprising an image processing resource.

EC12. The image processing resource of EC11 comprising at least one of an image capture resource, an encoder resource or a memory resource.

EC12a. The image capture resource of claim EC12 comprising an image analysis resource.

EC13. The encoder resource of EC12 comprising an encoder specified to encode an image type.

EC14. The shared communication resource of EC10 comprising a data bus.

EC15. The shared communication resource of EC10 comprising a network segment.

EC16. The shared communication resource of EC10 comprising a shared communication bandwidth under management of a traffic shaper.

EC17. The individual communication resource of EC10 comprising a network queue.

EC18. The network queue of EC17 associated with a low bandwidth WAN connection.

EC19. The individual communication resource of EC10 comprising a managed communication bandwidth.

EC20. The method of EC1 wherein determining the at least one portion of the plurality of image sequences comprises an available communication resource further comprises predicting a period for the available communication resource, the period used to synchronize utilization of the available communication resources for communicating at least one other portion of the plurality of image sequences.

EC30. The method of EC1 wherein determining the at least one portion of the plurality of image sequences comprises an image ready for communication comprises determining that the at least one portion is available.

EC31. The method of EC1 wherein determining the at least one portion of the plurality of image sequences comprises an image ready for communication comprises determining that a frame buffer enabled to maintain a current image associated with the at least one portion has been updated since a previous communication, the previous communication related to the at least one portion.

EC32. The method of EC1 wherein determining the at least one portion of the plurality of image sequences comprises an image ready for communication comprises determining an update status for the at least one portion.

EC33. The update status of EC32 comprising a tear-free state for the at least one portion in which essentially all image updates associated with a complete static image generation are completed.

EC34. The method of EC1 wherein determining the at least one portion of the plurality of image sequences comprises at least one of reordering drawing operations or suspending the drawing operations to ensure that the at least one portion is tear-free.

EC35. The method of EC1 wherein determining the at least one portion of the plurality of image sequences comprises an image ready for communication comprises interpreting at least one drawing command.

EC36. The method of EC1 wherein determining the at least one portion of the plurality of image sequences comprises an image ready for communication comprises monitoring at least one of image update timing or image update location.

EC37. The method of EC1 wherein determining the at least one portion of the plurality of image sequences comprises an image ready for communication comprises determining that a frame buffer enabled to maintain a current image associated with the at least one portion has been updated since a previous communication, the previous communication related to the at least one portion; and further determining that the frame buffer has not been updated for a define period of time.

EC38. The method of EC1 wherein the plurality of image sequences comprise at least one portion not ready for communication that was previously ready for communication.

EC39. The method of EC1 wherein communicating the at least one of the at least one portion of the plurality of image sequences comprises preventing updates to the at least one of the at least one portion of the plurality of image sequences while the at least one of the at least one portion of the plurality of image sequences is being captured.

EC40a. The method of EC1 wherein the first priority comprises a communication priority based on a duration following the determining the at least one portion of an image sequence is ready for communication.

EC40b. The method of EC1 wherein the first priority decreases with time when another update is expected in a predetermined period of time.

EC40c. The method of EC40b resultant in a dropped frame.

EC40d. The method of EC1 wherein the first priority comprises a communication priority based on a detected I/O event.

EC40e. The detected IO event of EC40d comprising a mouse event.

EC40. The method of EC1 wherein the first priority comprises a communication priority associated with the plurality of image sequences.

EC41. The method of EC1 wherein the first priority comprises a communication priority based on at least one of pending image updates or pending communication updates associated with the plurality of image sequences.

EC42. The method of EC1 wherein the first priority comprises an image sequence selection priority based on at least one of: communication recentness, analysis recentness or pending update status.

EC43. The method of EC1 wherein the first priority comprises a timing priority related to at least one of a first determined time to obtain the at least one portion, a second determined time to encode the at least one portion or a third determined time to transmit the at least one portion.

EC44. The method of EC1 wherein the first priority comprises performing the determining in a recentness order.

EC44a. The recentness order of EC44 associated with at least one of a recentness of image updates to each of the plurality of image sequences, a recentness of user I/O operations associated with each of the plurality of image sequences or a recentness of communication completion of each of the plurality of image sequences.

EC45. The recentness order of EC44 comprising ordering from a least recently communicated image sequence in the plurality to a most recently communicated image sequence in the plurality.

EC45a. The recentness order of EC44 comprising ordering from a least recently communicated image sequence in the plurality to a most recently communicated image sequence in the plurality.

EC45b. The recentness order of EC44 comprising ordering from a least recent image portion of an image sequence portion determined ready for communication to most recent image portion of an image sequence portion determined ready for communication.

EC46. The recentness order of EC44 comprising ordering in compliance with at least one of a round robin priority, a network fairness priority or a priority associated with a display refresh requirement.

EC50. The method of EC1 wherein the communicating the at least one of the at least one portion comprises encoding the at least one of the at least one portion.

EC50a. The method of EC1 wherein the communicating the at least one of the at least one portion comprises obtaining the at least one of the at least one portion.

EC51. The method of EC1 wherein the communicating the at least one of the at least one portion comprises at least one of obtaining the at least one of the at least one portion, encoding the at least one of the at least one portion, transmitting the at least one of the at least one portion or queuing, for transmission, the at least one of the at least one portion.

EC52. The transmitting the at least one of the at least one portion of EC51 comprising transmitting the at least one of the at least one portion to a remote computer.

EC53. The method of EC1 wherein the communicating the at least one of the at least one portion comprises communicating the at least one of the at least one portion according to a content update priority associated with the at least one of the at least one portion.

EC53a. The method of EC1 wherein the communicating the at least one of the at least one portion comprises communicating the at least one of the at least one portion according to a display configuration priority.

EC54. The display configuration priority of EC53a associated with a multiple-display configuration.

EC55. The method of EC1 wherein the communicating the at least one of the at least one portion comprises communicating the at least one of the at least one portion responsive to user input.

EC55a. The determining the at least one portion of the plurality of image sequences of EC1 comprising determining the at least one portion responsive to user input.

EC56. The user input of EC55a comprising mouse movement.

EC57. The method of EC1 wherein the communicating the at least one of the at least one portion comprises communicating the at least one of the at least one portion according to the first priority, the first priority comprising a second priority associated with at least one of an amount of image change or an image content type.

EC58. The method of EC1 wherein the communicating the at least one of the at least one portion comprises communicating the at least one of the at least one portion according to the first priority, the first priority comprising a user priority associated with the plurality of image sequences.

EC100. Apparatus for communicating a plurality of image sequences comprising at least one update manager enabled to determine image transfer requirements for at least one portion of at least one in the plurality of image sequences; image transfer means enabled to communicate image memory contents to a plurality of end points, the image memory contents comprising the at least one portion of the at least one in the plurality of image sequences, the transfer means further enabled to determine image transfer status; and a transfer scheduler enabled to schedule the image transfer means to communicate the portion of the one in the plurality of image sequences based on the image transfer requirements and the image transfer status.

EC101. The at least one update manager of EC100 comprising a set of machine-readable instructions in memory, the set of machine-readable instructions executed by a processor, the processor further configured to execute drawing software associated with the plurality of image sequences.

EC102. The at least one update manager of EC101 executed at least in part in a virtual machine operative on the processor.

EC103. The at least one update manager of EC101 executed at least in part in a hypervisor domain operative on the processor.

EC104. The processor of EC101 comprising one of a single core processor, a multi-core processor or a multi-processing system.

EC105. The transfer scheduler of EC100 comprising a set of machine readable instructions.

EC106. The set of machine readable instructions of EC105 executed in a hypervisor domain of a processor, the processor further configured to execute drawing software associated with the plurality of image sequences.

EC107. The transfer scheduler of EC100 comprising a logic module independent of a processor, the processor configured to execute drawing software associated with the plurality of image sequences.

EC108. The logic module of EC107 co-located with the image transfer means.

EC109. The at least one update manager of EC100 further enabled to present the image transfer status to the transfer scheduler.

EC110. The image transfer means of EC100 independent of a processor configured to execute drawing software associated with the plurality of image sequences.

EC111. The image transfer means of EC100 enabled to encode the at least one portion of the at least one in the plurality of image sequences.

EC112. The image transfer status of EC100 comprising status of at least one communication path to at least one of the plurality of endpoints.

EC113. The image transfer means of EC100 comprising image capture means for capturing the at least one portion of the at least one in the plurality of image sequences.

EC120. The at least one update manager of EC100 comprising state information used to determine the image status EC121. The state information of EC120 comprising at least one of buffer location information, image type information, frame update state information, window manager state information, pointer state information or refresh timing information.

EC122. The at least one update manager of EC100 comprising a drawing command analyzer to determine at least one of buffer location information, image type information, frame update state information, window manager state information, pointer state information or refresh timing information EC123. The at least one update manager of EC100 comprising a drawing command sequencer enabled to manage tear-free image capture by reordering or delaying drawing commands.

EC124. The drawing command sequencer of EC123 enabled to return the drawing commands to a drawing software command queue.

EC125. The at least one update manager of EC100 comprising a means for detecting image memory updates.

EC126. The means for detecting image memory updates of EC125 comprising a trap enabled to analyze memory access operations.

EC127. The means for detecting image memory updates of EC125 enabled to utilize modified processor instructions to record image update area information.

EC130. The at least one update manager of EC100 comprising image change information associated with the one in the plurality of image sequences.

EC131. The at least one update manager of EC100 comprising at least one of location of changed pixels or attributes of changed pixels.

EC140. The at least one update manager of EC100 comprising a timing function enabled to generate frame timing information for drawing software associated with the at least one from the plurality of image sequences.

EC141. The frame timing information of EC140 associated with the communication of the at least part of one from the plurality of image sequences.

EC142. The frame timing information of EC140 associated with display timing information received from the image transfer means EC143. The frame timing information of EC140 associated with display timing information communicated from at least one in the plurality of end points.

EC144. The frame timing information of EC140 associated with audio timing information received by the at least one update manager.

EC145. The frame timing information of EC140 associated with audio timing information received by the at least one in the plurality of end points.

EC146. The frame timing information of EC140 associated with operating system timing information received by the at least one update manager.

EC147. The frame timing information of EC140 associated with update timing information received from the transfer scheduler.

EC148. The at least one update manager of EC100 comprising a timing function enabled to suspend drawing software associated with the at least one from the plurality of image sequences.

EC150. The image transfer means of EC100 comprising a network interface, a means for obtaining image updates and an image processing system.

EC151. The means for obtaining image updates of EC150 comprising Direct Memory Access (DMA) resources coupled between a processor memory and an image processing memory.

EC152. The means for obtaining image updates of EC151 comprising a processor enabled to write image updates to the image processing memory.

EC153. The processor of EC152 further enabled to perform operations of the at least one update manager.

EC154. The image processing memory of EC151 comprising at least one processing order list.

EC155. The image processing system of EC150 comprising at least one shared encoding resource.

EC156. The image processing system of EC150 comprising storage for at least one input image associated with the at least one image sequence.

EC157. The image processing system of EC150 comprising storage for at least one encoded image associated with the at least one image sequence.

EC158. The network interface of EC150 independent of a second network interface associated with a processor enabled to render images associated with the at least one from the plurality of image sequences.

EC159. The image transfer means of EC100 enabled to provide the transfer scheduler with communications resource information.

EC160. The communications resource information of EC159 comprising at least one of shared encoding resource availability, input image queue status, encoded image queue status or a network queue status.

EC161. The image transfer means of EC100 enabled to provide the at least one update manager with display timing information.

EC170. The transfer scheduler of EC100 comprising resource association information.

EC171. The resource association information of EC170 comprising associations between the plurality of image sequences and at least one of display attributes, user attributes or communication resources.

EC172. The resource association information of EC171 enabled to track communications resource utilization.

EC173. The resource association information of EC171 enabled to manage communication resource utilization.

EC174. The resource association information of EC171 enabled to manage communication resource utilization per user and per resource.

EC175. The transfer scheduler of EC100 comprising image sequence priority information associated with the plurality of image sequences EC176. The image sequence priority information of EC175 comprising information related to at least one of user interface service requirements, display refresh requirements, image update requirements, content-based priority information or communications resource availability information.

EC177. The image sequence priority information of EC175 comprising means for determining transfer completion timing of a previous portion associated with the plurality of image sequences.

EC178. The transfer scheduler of EC100 comprising image transfer history information supportive of predicting communications resource availability.

EC179. The transfer scheduler of EC100 comprising a scheduler interface enabled to provide priority information to hypervisor scheduling software.

EC180. The transfer scheduler of EC100 comprising a transfer control interface enabled to provide image transfer information to the image transfer means.

EC181. The transfer scheduler of EC100 comprising a status interface enabled to receive transfer status information from the image transfer means.

EC181. The transfer scheduler of EC100 comprising a timing interface enabled to provide update timing information to the at least one update manager.

EC200. A computer-readable medium containing instructions which, when executed by a computer, communicate a plurality of image sequences by performing prioritized repeated acts of determining that at least one portion of one in the plurality of image sequences has an available communication resource; determining that the at least one portion of the one in the plurality of image sequences is ready for communication; and communicating the at least one portion of the one in the plurality of image sequences.

EC400. (FIG. 7) A method for communicating a plurality of image sequences comprising repeated acts of determining a selection comprising at least one image portion, the at least one image portion from the plurality of image sequences, each at least one image portion in the selection ready for communication, each at least one image portion in the selection comprising an available communication resource; and communicating at least one from the selection; wherein at least one of the determining the selection and the communicating the at least one from the selection is based on a priority.

While the foregoing is directed to embodiments of the present invention, other and further embodiments of the invention may be devised without departing from the basic scope thereof, and the scope thereof is determined by the claims that follow.

The invention claimed is:

1. An apparatus for generating and communicating encoded images, comprising:
one or more graphics processors for rendering, for each display of a plurality of displays, a plurality of images from a plurality of drawing command sets;
one or more hardware based encoders that generate an encoding of each image of the plurality of images, wherein each encoding comprises indications of changed and unchanged portions of a corresponding image of the plurality of images;
at least one storage device storing processor-executable instructions which, when executed by one or more processors, coupled to the one or more graphics processors and the one or more hardware based encoders, performs a method comprising:
generating each drawing command set of the plurality of drawing commands sets by executing, on the one or more processors, a separate virtual machine (VM) of a plurality of VMs in response to Human Input Device (HID) events received via an Internet Protocol (IP) network from a network location associated with a corresponding display of the plurality of displays, wherein the plurality of images represent application output of a remote desktop session; and
scheduling generation of the encoding of each image of the plurality of images based on completion of
(i) a rendering of an associated image from the plurality of images and
(ii) a transmitting at an available IP network bandwidth, via the IP network, of an encoding of a previously associated image from the plurality of images, wherein scheduling generation of a first encoding of the plurality of images increases a use of an image communication resource in response to an input event associated with the first encoding and scheduling generation of the first encoding comprises dropping at least one image rendered from the plurality of drawing commands sets.

2. The apparatus of claim 1, wherein the one or more hardware based encoders identifies changed text portions and changed picture portions of each image of the plurality of images, encodes the changed text portions using a lossless encoder, and encodes changed picture portions using a lossy encoder.

3. The apparatus of claim 1, wherein all VMs of the plurality of VMs are executed on the one or more processors coupled to the one or more graphics processors by a computer expansion bus, wherein the one or more graphics processors is an image-rendering engine of a Graphics Processing Unit (GPU), wherein the computer expansion bus is a Peripheral Component Interconnect Express (PCIe) bus, and wherein each of the VMs of the plurality of VMs comprises an operating system that generates an associated drawing command set of the plurality of drawing command sets.

4. The apparatus of claim 1, wherein changed portions of the plurality of images are transferred to the one or more hardware based encoders based on the indications of changed and unchanged portions.

5. The apparatus of claim 1, wherein the one or more hardware based encoders directly accesses the plurality of images from a memory of the one or more graphics processors.

6. The apparatus of claim 1, wherein a signal indicating a completion of a rendering of an image of the plurality of images is delayed until the image is encoded and partly transmitted, and wherein a delay of the signal delays a rendering of subsequent drawing commands for a display associated with the image.

7. The apparatus of claim 1, wherein scheduling generation of the encoding determines a completion of a rendering of a first image of the plurality of images, determines a schedule for communicating an encoding of the first image to a display of the plurality of displays, and delays drawing commands for a subsequent update to the first image based on the schedule for communicating the encoding of the first image.

8. The apparatus of claim 1, wherein notification, to a corresponding VM, of completion of rendering an image of the plurality of images is delayed based on a communication schedule of the image to a display of the plurality of displays.

9. The apparatus of claim 1, wherein the one or more hardware based encoders selectively encodes each portion of a plurality of portions of an image of the plurality of images as one of unchanged, a lossless encoding, or a lossy encoding, based on an analysis of the image.

10. The apparatus of claim 1, wherein the one or more hardware based encoders selects a lossless or a lossy encoding for each changed portion of the plurality of images based on contrast and color content of the changed portion.

11. A method for generating and communicating encoded images, comprising:
rendering, by one or more graphics processors and for each display of a plurality of displays, a plurality of images from a plurality of drawing command sets;
generating, by one or more hardware encoders, an encoding of each image of the plurality of images, wherein each encoding comprises indications of changed and unchanged portions of a corresponding image of the plurality of images;
generating each drawing command set of the plurality of drawing commands sets by executing, on one or more processors, a separate virtual machine (VM) of a plurality of VMs in response to Human Input Device (HID) events received via an Internet Protocol (IP) network from a network location associated with a corresponding display of the plurality of displays, wherein the plurality of images represent application output of a remote desktop session; and
scheduling, by a scheduler executing on the one or more processors, generation of the encoding of each image of the plurality of images based on completion of (i) a rendering of an associated image from the plurality of images and (ii) a transmitting, via the IP network, of a previous encoding of a previously associated image from the plurality of images, wherein scheduling generation of a first encoding of the plurality of images increases a use of an image communication resource in response to an input event associated with the first encoding, and scheduling generation of the first encoding comprises dropping at least one image rendered from the plurality of drawing commands sets in rendering the plurality of images and wherein the one or more processors are coupled to the one or more hardware encoders by a computer expansion bus.

12. The method of claim 11, wherein generating the encoding of each image comprises identifying changed text portions and changed picture portions of each image of the plurality of images, encoding the changed text portions using a lossless encoder, and encoding changed picture portions using a lossy encoder.

13. The method of claim 11, wherein the one or more processors are coupled to the graphics processor by the computer expansion bus, and wherein each of the VMs of the plurality of VMs comprises an operating system that generates an associated drawing command set of the plurality of drawing command sets.

14. The method of claim 11, wherein generating the encoding of each image comprises transferring changed portions of the plurality of images to the image encoder based on the indications of changed and unchanged portions.

15. The method of claim 11, wherein a signal indicating a completion of a rendering of an image of the plurality of images is delayed until the image is encoded and partly transmitted, and wherein a delay of the signal delays a rendering of subsequent drawing commands for a display associated with the image.

16. The method of claim 11, wherein scheduling generation of the first encoding comprises: determining completion of a rendering of a first image of the plurality of images, determining a schedule for communicating the first encoding of the first image to a display of the plurality of displays, and delaying drawing commands for a subsequent update to the first image based on the schedule for communicating the first encoding of the first image.

17. The method of claim 11, wherein notification, to a corresponding VM, of completion of rendering an image of the plurality of images is delayed based on a communication schedule of the image to a display of the plurality of displays.

18. The method of claim 11, wherein generating the encoding of each image comprises selecting a lossless or a lossy encoding for each changed portion of the plurality of images based on contrast and color content of the changed portion.

* * * * *